US006330539B1

(12) United States Patent
Takayama et al.

(10) Patent No.: US 6,330,539 B1
(45) Date of Patent: *Dec. 11, 2001

(54) DIALOG INTERFACE SYSTEM

(75) Inventors: Kuniharu Takayama; Masahiro Matsuoka; Takeshi Koshiba; Shinya Hosogi; Minoru Sekiguchi; Yoshiharu Maeda; Hirohisa Naito, all of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,472

(22) Filed: Jan. 21, 1999

(30) Foreign Application Priority Data

Feb. 5, 1998 (JP) .................................................. 10-024471

(51) Int. Cl.⁷ ...................................................... G10L 15/04
(52) U.S. Cl. .......................... 704/275; 704/270; 704/251; 704/257; 704/258
(58) Field of Search ..................... 704/200, 231, 704/258, 251, 257, 270, 272, 275

(56) References Cited

U.S. PATENT DOCUMENTS

| 5,357,596 | * | 10/1994 | Takebayashi et al. | 704/275 |
| 5,577,165 | * | 11/1996 | Takebayashi et al. | 704/275 |
| 5,729,659 | * | 3/1998 | Potter | 704/270 |
| 5,991,719 | * | 11/1999 | Yazaki et al. | 704/251 |
| 6,035,275 | * | 3/2000 | Brode et al. | 704/275 |
| 6,044,347 | * | 3/2000 | Abella et al. | 704/272 |
| 6,052,666 | * | 4/2000 | Diehl et al. | 704/275 |
| 6,073,102 | * | 6/2000 | Block | 704/275 |

FOREIGN PATENT DOCUMENTS

| 2 165 969 A | * | 4/1986 | (GB) | G06F/3/16 |
| 97/32431 | * | 9/1997 | (WO) | H04M/3/50 |

OTHER PUBLICATIONS

Michael K. Brown et al.; SAM: A Perceptive Spoken Language Understanding Robot; IEEE Transactions on Systems, Man, and Cybernetics, vol. 22, No. 6, Nov. 1992.*

R. Cole, et al., "The Challenge of Spoken Language Systems: Research Directions for the Nineties", *IEEE Transactions of Speech and Audio Processing*, vol. 3, No. 1, (01–95), pp. 1–21.

* cited by examiner

*Primary Examiner*—William Korzuch
*Assistant Examiner*—Abul K. Azad
(74) *Attorney, Agent, or Firm*—Staas & Halsey LLP

(57) ABSTRACT

In the dialog interface apparatus of the present invention, input speech is converted to an input semantic representation by a speech recognition unit, and a dialog management unit outputs an output semantic representation that corresponds to the input semantic representation, based on the input semantic representation obtained by the speech recognition unit. Having received the output semantic representation from the dialog management unit, a speech synthesis unit converts the output semantic representation to output speech identifying a specific dialog target and outputs the output speech. Further, the dialog management unit outputs to an innate operation execution unit an innate operation command that corresponds to the input semantic representation. The innate operation execution unit receives the innate operation command from the dialog management unit and executes an operation corresponding to the innate operation command.

30 Claims, 38 Drawing Sheets

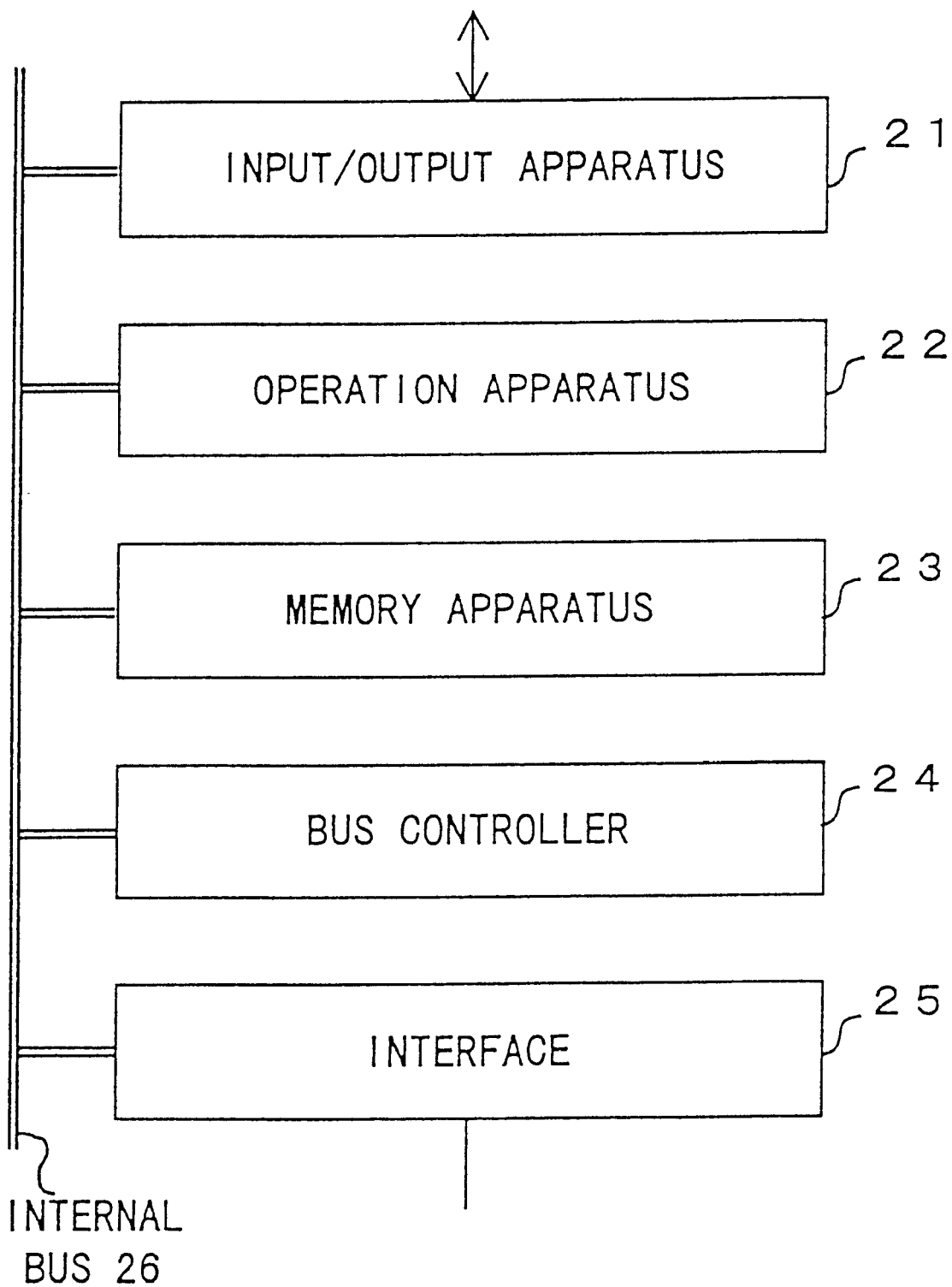
F I G. 7 a. If receive in-voice$_p$ from *any Humans or Things*,
   continue sending out-wait-signal to *Speech Synthesis System during receiving*,
   push in in-voice$_p$ to sr-in-buffer$_{bottom}$.
   Return to label "a".

b. If find in-voice$_u$ in sr-in-buffer$_{top}$,
   pop out in-voice$_u$ from sr-in-buffer$_{top}$,
   convert in-voice$_u$ to in-phonemes$_u$,
   convert in-phonemes$_u$ to in-characters$_u$,
   convert in-characters$_u$ to in-speech$_u$,
   push in in-speech$_u$ to sr-out-buffer$_{bottom}$.
   Return to label "b".

FIG. 10

$$\begin{aligned}
\text{dialog-rule}_k &= \text{in-speech}_k \rightarrow \{\text{out-speech}_k, \text{innate-operation}_k\} \\
&= [(\text{in-from-whom}_k), \text{in-to-whom}_k, \text{in-message}_k] \\
&\rightarrow [(\text{out-from-whom}_k), \text{out-to-whom}_k, \text{out-message}_k], \\
&\quad \text{innate-operation}_k \\
&= [(\text{in-from-whom}_k), \text{name-of-thing}, \text{in-message}_k] \\
&\rightarrow [(\text{name-of-thing}), \text{out-to-whom}_k, \text{out-message}_k], \\
&\quad \text{innate-operation}_k
\end{aligned}$$

FIG. 13

1. If find in-speech$_i$ = [(in-from-whom$_i$), in-to-whom$_i$, in-message$_i$] in sr-out-buffer$_{top}$, pop out in-speech$_i$ from sr-out-buffer$_{top}$.

2. If find dialog-rule$_k$ = [(in-from-whom$_k$), name-of-thing, in-message$_k$]
   $\rightarrow$ [(name-of-thing), out-to-whom$_k$, out-message$_k$], innate-operation$_k$ where (in-to-whom$_i$ = name-of-thing $\vee$ anyone $\vee$ everyone $\vee$ not-specified) $\wedge$ (in-message$_i$ = in-message$_k$), set out-speech$_i$ = [(out-from-whom$_i$, ) out-to-whom$_i$, out-message$_i$]

where (out-from-whom$_i$ := name-of-thing),
   (out-to-whom$_i$ := out-to-whom$_k$ (if out-to-whom$_k$ $\neq$ not-specified),
   := in-from-whom$_i$ (if out-to-whom$_k$ = not-specified)),
   (out-message$_i$ := out-message$_k$),
   set innate-operation$_i$ := innate-operation$_k$.

3. If not find in-speech$_{i+1}$ = [(in-from-whom$_{i+1}$), in-to-whom$_{i+1}$, in-message$_{i+1}$] in sr-out-buffer$_{top}$
   or if (in-to-whom$_i$ $\neq$ anyone | not-specified) $\vee$ (out-message$_i$ $\neq$ in-message$_{i+1}$),
   send out-speech$_i$ to ss-in-buffer$_{bottom}$,
   send innate-operation$_i$ to io-out-buffer$_{bottom}$.
   Return to label "1".

F I G. 14 a. If find out-speech$_v$ in ss-in-buffer$_{top}$,
   pop out out-speech$_v$ from ss-in-buffer$_{top}$,
   convert out-speech$_v$ to out-characters$_v$,
   convert out-characters$_v$ to out-phonemes$_v$,
   convert out-phonemes$_v$ to out-voice$_v$,
   push in out-voice$_v$ to ss-out-buffer$_{bottom}$.
   Return to label "a".

b. If find out-voice$_q$ in ss-out-buffer$_{top}$
   and if not receiving out-wait-signal from *Speech Recognition System*,
   pop out out-voice$_q$ from ss-out-buffer$_{top}$.

c. continue sending out-synchronize-signal to *Innate Operation System* until receiving.
   if receiving out-synchronize-signal from *Innate Operation System*,
      send out-voice$_q$ to any *Humans and Things*
   else
      return to label "c".
   Return to label "b".

FIG. 18 b. If find innate-operation$_q$ in io-out-buffer$_{top}$,
    pop out innate-operation$_q$ from io-out-buffer$_{top}$.
    If receiving out-synchronize-signal from *Speech Synthesis System*,
    sending out-synchronize-signal to *Speech Synthesis System*,
    execute innate-operation$_q$
    else
        return to label "c".
c. Return to label "b".

FIG. 21

```
Entrance-Light:
\in-speech[ Entrance-Light , turn-on  !] \or
\in-speech[ Entrance , turn-on-light !] \or
\in-speech[ All-Lights , turn-on !] \or
\in-speech[ Everyone , turn-on-light !] \or
\in-speech[(Anyone ,) turn-on-light !] \or
\in-speech[ Everyone, I'm-home .]
-> \innate-operation[turn-on-light()] ;
```

FIG. 24

```
Clock-1:
\in-speech[(Anyone ,) what-time-is-it-now ?]
  -> \out-speech[(Sir. ,) $Time .] ;
\in-speech[ Clock-1 \or All-Clocks , synchronize-to $clock !]
  -> \out-speech[$clock , teach-time !] ;
\in-speech[ Clock-1 , teach-time !]
  -> \out-speech[(Anyone ,) change-time-to $Time !] ;
\in-speech[(Anyone ,) change-time-to $Time !]
  -> \innate-operation[change-time-to($Time)] \and
     \out-speech[(Sir. ,) thank you .] ;
```

FIG. 26

Bath:
\in-speech[ Bath, prepare !] \or
\in-speech[ Bath, pour-hot-water !]
-> \innate-operation[beep-buzzer()],
 \innate-operation[pour-hot-water()] ;

FIG. 28

```
Informator:
\in-speech[ Informator , search $key !]
 -> \innate-operation[search($key, $content)] \and
    \out-speech[(Sir. ,) $content .] ;

\in-speech[ Informator , record-that $key is $content !]
 -> \out-speech[(Sir. ,) sure .] \and
    \innate-operation[record($key, $content)] ;

\in-speech[ Informator , record-video $tv-program !]
 -> \out-speech[(Sir. ,) sure .] \and
    \innate-operation[search($tv-program, $tv-schedule)] \and
    \out-speech[ Video, record-video $tv-schedule !] ;

\in-speech[ Informator , call $to-whom !]
 -> \out-speech[(Sir. ,) sure .] \and
    \innate-operation[search({$to-whom \and ''phone-no''}, $phone-no)] \and
    \out-speech[ Phone, dial $phone-no !] ;
```

FIG. 30

Video:
```
\in-speech[ Video , record-video $tv-schedule !]
-> \out-speech[(Sir. ,) sure .] \and
   \innate-operation[record-video($tv-schedule)] ;
```

Phone:
```
\in-speech[ Phone , dial $phone-no !]
-> \out-speech[(Sir. ,) sure .] \and
   \innate-operation[dial($phone-no)] ;
```

FIG. 31

```
Closet-1:
\in-speech[ Closet-1 , keep $thing !]
-> \out-speech[(Sir. ,) sure .] \and
 \add-dialog-rule[
    \in-speech[ Closet-1 \or (Anyone) \or Everyone , where-is $thing ?]
    -> \out-speech[(Sir. ,) Closet-1 keeps $thing .]
 ] ;

\in-speech[ Closet-1 , take-out $thing !]
-> \out-speech[(Sir. ,) sure .] \and
 \delete-dialog-rule[
    \in-speech[ Closet-1 \or (Anyone) \or Everyone , where-is $thing ?]
    -> \out-speech[(Sir. ,) Closet-1 keeps $thing .]
 ] ;

\in-speech[ Closet-1 \or (Anyone) \or Everyone , where-is ``black-coat'' ?]
-> \out-speech[(Sir. ,) Closet-1 keeps ``black-coat'' .] ;
```

FIG. 33

```
Chief-Robot:
   \in-speech[Chief-Robot , set-schedule-as {$time, $floor} !]
   -> \innate-operation[schedule({$time, $floor}, {$robot, $schedule})] \and
      \out-speech[Clearning-Robot-$robot , set-schedule-as($time, $floor} !] ;

Clearning-Robot-1:
   \in-speech[Clearning-Robot-1, set-schedule-as {$time, $floor} !]
   -> \innate-operation[set-schedule-as($time, $floor)] \and
      \out-speech[(Sir. ,) sure .] ;
```

FIG. 35

```
Guide-Robot:
\in-speech[(Anyone ,) teach $key !]
 -> \innate-operation[search($key, $content)] \and
    \out-speech[(Sir. ,) how-about $content ?] ;
\in-speech[(Anyone ,) set-address-to $address !]
 -> \innate-operation[set-address-to($address)] ;
    \out-speech[(Sir. ,) sure .] ;
\in-speech[(Anyone ,) send-data-of $content !]
 -> \innate-operation[send-data-of($content)] ;
    \out-speech[(Sir. ,) receive-data-of $content !] ;
\in-speech[(Anyone ,) thank you .]
 -> \out-speech[(Sir. ,) you are welcome .] ;
```

FIG. 37

```
Navigator:
    \in-speech[(Anyone ,) get-data-of $content !]
 -> \out-speech[(Sir. ,) sure .] \and
    \out-speech[(Anyone ,) set-address-to 111.222.333.444 !] \and
    \out-speech[(Anyone ,) send-data-of $content !] ;
    \in-speech[(Anyone ,) receive-data-of $content !]
 -> \innate-operation[receive-data-of($content)] \and
    \out-speech[(Sir. ,) thank you .] ;
```

FIG. 38

DIALOG INTERFACE SYSTEM

BACKGROUND OF THE INVENTION

1. Field of the Invention

The present invention relates to an information processing apparatus furnished with a user interface adaptable, illustratively, to a computer or an electrical device, or to any variety of industrial machinery. The present invention relates more particularly to a dialog interface system that allows a human and an inanimate entity (hereinafter a "thing" or "things"), as well as a thing and a fellow thing, to converse by way of speech.

2. Description of the Related Art

A remote control interface utilizing a remote control is pervasive in today's field of electrical appliances, of which, it may be said, the television and the video recorder/player are representative. Although the remote control may be suitable to tasks involving simple functions like changing television channels or adjusting television volume, it is unfit for more complex tasks. In fact, it cannot be said that even engineers, not to mention novices and the elderly, have completely mastered the use of electrical appliances comprising various and advanced functions.

In the computer field, in which more sophisticated tasks are required, graphical user interfaces (hereinafter "GUI") utilizing windows and a mouse are widely employed. The specifications differ for each product, however, and there remain many inconveniences for those who use these products.

Further, because the GUI itself represents a task with which novices and the elderly have little experience, there are for them many difficulties. Also, because the GUI by its very nature requires a screen, it is not well-suited to many types of electrical appliances and industrial machinery that do not require a display.

For these reasons, speech recognition and synthesis technologies, which are natural to humans and require no display, recently have received attention as a next-generation user interface for these systems. These technologies are already employed presently in, illustratively, car navigation systems and some computer systems.

In research regarding interfaces, moreover, many have recently taken notice of the multi-modal interface (see, for example, R. A. Bolt, "The Integrated Multi-modal Interface", (invited paper) IEICE Transactions on Information Systems, vol. J70-D, no. 11, pp. 2017–2025, November 1987; Katashi Nagao, "Multimodal Human-Computer Interaction: Agent Oriented and Real-World-Oriented", (in Japanese), Journal of the Society of Instrument and Control Engineers, vol. 35, no. 1, pp. 65–70, January 1996; Tsuneo Nitta, "From GUI Multi-modal UI (MUI)*, (in Japanese), Journal of Information Processing Society of Japan, vol. 36, no. 11, pp. 1039–1046, November 1995.)

This research seeks to facilitate dialog with, for example, a computer by using not only GUI-like visualization, but also speech or gestures and other illustrative multi-modal aspects.

On the other hand, computers are connected to a variety of things found in the environments in which humans live. Research is being conducted regarding ubiquitous computing, which seeks to assist, among other things, human actions (see, for example, M. Weiser, "Some Computer Science Issues in Ubiquitous Computing", Communications of the ACM, vol. 36, no. 7, pp. 74–85, July, 1993; Katashi Nagao, "Real-World-Oriented Human-Computer Interaction: A Survey", (in Japanese), Systems, Control and Information, vol. 40, no. 9, pp. 385–392, September, 1996).

This would entail, by way of example, computers becoming ubiquitous on, illustratively, library shelves, thus endeavoring to support searching books by way of communication with a mobile computer or according to speech.

In respect of voice research, moreover, research relating to the interaction between computers and humans has been undertaken with great fervor in recent years (see, for example, R. Cole, L. Hirschman, L. Atlas, M. Beckman, A. Biermann, M. Bush, M. Clements, J. Cohen, O. Garcia, B. Hanson, H. Hermansky, S. Levinson, K. McKeown, N. Morgan, D. G. Novick, M. Ostendorf, S. Oviatt, P. Price, H. Silverman, J. Spitz, A. Waibel, C. Weinstein, S. Zahorian, and V. Zue, "The Challenge of Spoken Language Systems: Research Directions for the Nineties", IEEE Transactions on Speech and Audio Processing, vol. 3, no. 1, pp. 1–21, January 1995; Katunobu Itou, "Speech Dialog System", (in Japanese), The Institute of Electronics, Information and Communication Engineers, Technical Report, vol. 92, no. 127, Voices, no. SP92-38, pp. 23–30, July, 1992; Yoichi Takebayashi, "Human-Computer Dialogue using Multimedia Understanding and Synthesis Functions", (in Japanese), The Institute of Electronics, Information and Communication Engineers, Technical Report, vol. 92, no. SP92-37, pp. 15–22, July, 1992).

Systems that utilize the above-described conventional speech recognition and synthesis technologies generally presume communication between only one human and one thing.

It is predicted that the number of systems with speech recognition and synthesis functions will continue to increase. When these systems are plural and are mixed with humans, moreover, it is predicted that a plurality of systems will execute in error a command issued to one system, and that a response issued to a human from one system will be mistakenly interpreted by a different system as a command issued to the latter system.

The present invention was conceived in consideration of the circumstances described above. The present invention aims to provide an interface system that is at once responsive to humans and practical and, further, that facilitates dialog by speech not only among humans, but also among things, free of mistaken operations, and without requiring a display.

SUMMARY OF THE INVENTION

The present invention proposes the concept of a "things' dialog interface" (hereinafter "TDI") as one means of solving the problems inherent in this type of interface and its attendant networking and advancing positively the evolution of this kind of interface. TDI is an interface that facilitates conversation by speech among humans and things, as well as among fellow things, by adding not only to computers, but also to various things (all things, including, but not limited to, electrical devices, industrial machinery, and like objects), speech recognition and synthesis functions.

As above explained, speech recognition and synthesis technologies are already presently used in car navigation systems and in some computers. However, these applications generally assume dialog between only one human and one thing.

On the other hand, the TDI herein proposed is decidedly different, in that it makes possible dialog not only as among humans and things, but also among fellow things.

As represented in FIG. 1, a dialog in a conventional system is accomplished between a human and a thing on a one-to-one basis. For that reason, it is unnecessary to clarify, with respect to a particular dialog, for whom, or for what, that particular communication is intended. By contrast, in the TDI system, it is possible to undertake communication among a plurality of humans, among a plurality of things, or among a plurality of humans and things, as is shown in FIG. 2. Consequently, the TDI system must indicate with respect to whom a particular communication is initiated. To achieve this purpose, data (for example, in-to-whom) indicating by whom a dialog is initiated and data (for example, out-to-whom) indicating to whom a communication is directed are used.

In particular respect to the TDI system, it is possible, as is shown in FIG. 3, to designate as communication-related items data such as a specific human, a specific thing, "anyone", or "everyone", or any combination of these illustrative data items.

So that other things do not initiate a dialog while someone or something is presently engaged in a dialog, an out-wait-signal, for example, is used in the TDI system. In the conventional system, on the other hand, a function utilizing an out-wait-signal is not employed, because there is no interference with the dialog between one human and one thing.

Furthermore, because the TDI system is furnished with a function employing an out-wait-signal, it is possible to delay synchronously the execution of innate operations with communications that are similarly delayed. For that reason, a function utilizing, illustratively, an out-synchronize-signal, also, can be added. The conventional system is not equipped with this function employing an out-synchronize-signal.

By raising in one stretch the computer interface to a level that is natural to humans, like speech, the so called GUI war among competing companies becomes irrelevant. Because speech has long been used as a means of human communication, moreover, it is likely that the issue of standardization will become passe. Finally, that a screen is unnecessary, also, is a significant feature of the TDI system.

In many electrical devices and industrial machines, a large display like that used in a computer is not required. The TDI system is well-suited to this aspect, as well. Also, because a display is unnecessary, the TDI system is amenable to miniaturization.

Furthermore, because the TDI system requires no manual inputs, it is convenient for people occupied with tasks and for the physically infirm.

As to networking issues, speech is promising in interface networks within homes, for example, because speech is wireless and capable of simple broadcast. By taking advantage of existing telephone networks, moreover, a remote interface, too, is feasible.

Radio wave and infrared ray technologies are deemed promising in respect of radio, or wireless, networking. It is to be noted, however, that these technologies are suited to data networking. It seems plausible, then, to assert that speech is suitable for interface networking, particularly in view of the fact that a human can easily be interposed in interface networking.

TDI makes possible mutual communication between various electrical devices, industrial machinery, and the users thereof, and facilitates the communication, adjustment, and execution of information and tasks. It is likely that, in the future, the availability of electrical devices and industrial machinery will be limited to intelligent products equipped with learning and adaptive functions, in addition to speech recognition and synthesis functions. The possibility of employing TDI to other attributes, such as volume, communication velocity, quality, and rhythm, is also conceivable.

It is thus believed that TDI will be effective as a next generation, post-GUI interface.

An objective of the TDI system is to provide an interface that is at once easy for humans and practical. Because TDI, too, takes speech as its medium, it can be included as a part of the above-described multi-modal interface. Similarly, inasmuch as TDI adds a speech interface to a variety of things, it can also be included as a part of the above described ubiquitous computing.

As discussed above, research relating to the interaction between humans and computers has been carried out actively in recent years. It appears, however, that attention is not yet being paid to dialog between things, like that contemplated in the TDI system. One significant advantage to dialog by speech among things is that a human can simultaneously understand that dialog and, where necessary, make revisions and corrections. Thus, in the TDI system, a human can easily be interposed in the communication among things. This point, too, compels the conclusion that the TDI system is amenable to humans.

The dialog interface system contemplated by the present invention comprises, a speech recognition unit for converting input speech to an input semantic representation, a dialog management unit for outputting an output semantic representation that corresponds to the input semantic representation, based on the input semantic representation obtained by the speech recognition unit, and a speech synthesis unit for receiving the output semantic representation from the dialog management unit, converting the output semantic representation to output speech in which a specific dialog target is designated, and outputting the output speech.

The system can further comprise an innate operation execution unit for receiving an innate operation command from the dialog management unit and executing a function corresponding to the innate operation command. In this case, the dialog management unit outputs, to the innate operation execution unit, the innate operation command that corresponds to the input semantic representation, based on the input semantic representation obtained by the speech recognition unit.

The dialog management unit can identify the origin of the input speech, based on the input semantic representation received from the speech recognition unit and can identify the origin of the output speech, based on the input semantic representation received from the speech recognition unit, and can output the output semantic representation and the innate operation command after consideration of the identified origin.

The speech recognition unit can output a delay command that delays the output of the output speech to the speech synthesis unit, during the time that input speech is being inputted. Also, the dialog management unit can comprise a dialog rules storage unit for storing an aggregate of dialog rules for the input semantic representation and the output semantic representation. Additionally, the dialog management unit outputs at least one of the output semantic representation corresponding to the input semantic representation inputted from the speech recognition unit, based on the dialog rules stored in the dialog rules storage unit, or the innate operation command. In this case, the dialog management unit has functions for making deletions, changes, and additions with respect to the dialog rules stored in the dialog rules storage unit, and dismisses one of the input semantic representations, when one of the successive input semantic representations and the output semantic representations corresponding to the other input semantic representations are identical.

Similarly, the speech synthesis unit and the innate operation execution unit can synchronize the output of the output speech and the execution of the innate operation by way of a synchronization notification signal.

The dialog interface apparatus contemplated by the present invention comprises, a speech recognition unit for converting input speech to an input semantic representation, a dialog management unit for identifying an origin of the input speech, based on the input semantic representation obtained by the speech recognition unit, and outputting a corresponding innate operation command based on the identified origin and the input semantic representation, and an innate operation execution unit for executing a function corresponding to the innate operation command.

Similarly, another dialog interface apparatus contemplated by the present invention comprises, a dialog management unit for outputting an output semantic representation and data specifying the dialog target that should recognize the output semantic representation, and a speech synthesis unit for converting the output semantic representation and the dialog target to expressive output speech, based on the data received from the dialog management unit, and for outputting the output speech.

The method of the present invention is a method of processing based on a dialog, using a dialog management apparatus, and comprises the steps of: converting input speech to an input semantic representation, generating an output semantic representation corresponding to the input semantic representation, based on the input semantic representation, converting the output semantic representation to output speech, for which specific dialog target is designated, and outputting the output speech.

This method may also be capable of comprising the steps of, generating an innate operation command corresponding to an input semantic representation, based on the input semantic representation, and receiving the innate operation command and executing an operation corresponding to the innate operation command. Further, this method may comprise the steps of, identifying an origin of the input speech, based on the input semantic representation, and outputting the output semantic representation upon consideration of the identified origin.

Likewise, this method may comprise the steps of, identifying the origin of the input speech, based on the input semantic representation, and generating the innate operation command upon consideration of the identified origin. Further, this method may comprise the step of outputting a delay command that delays the output of the output speech, while input speech is being inputted.

This method may also comprise the step of outputting, based on the stored dialog rules, at least one of the output semantic representation corresponding to the input semantic representation or an innate operation command. Furthermore, this method may comprise the step of dismissing one of the input semantic representations, when one of the successive input semantic representations and the output semantic representations corresponding to the other input semantic representations are identical. Also, this system may comprise the step of synchronizing the output of the output speech and the execution of the innate operation, by way of a synchronization notification signal.

Another method contemplated by the present invention comprises the steps of, converting the input speech to an input semantic representation, identifying the origin of the input speech, based on the input semantic representation, outputting a corresponding innate operation command based on the input semantic representation, and executing an operation corresponding to the innate operation command.

Yet another method contemplated by the present invention comprises the steps of, outputting the output semantic representation and the data specifying the dialog target that is to recognize the output semantic representation; and converting the output semantic representation and the dialog target to expressive output speech and outputting that output speech.

The storage medium contemplated by the present invention is a computer-readable storage medium containing a program for causing a computer to execute a processing method, based on a dialog. Here, the "processing methods" can correspond to the method contemplated by the present invention. The storage medium of the present invention can be realized as an internal computer storage medium comprising, by way of illustration, ROM, RAM, or a hard drive, or as an external storage medium, of which CD-ROM, MD, and a floppy disk are representative.

BRIEF DESCRIPTION OF THE DRAWINGS

FIG. 7 discloses a hardware configuration for the TDI system according to the present invention.

FIG. 10 discloses the speech recognition processing order according to the speech recognition system.

FIG. 13 discloses the dialog rules stored in the dialog rules database.

FIG. 14 discloses the processing order of the dialog management system.

FIG. 18 discloses the speech synthesis processing order according to the speech synthesis system.

FIG. 21 discloses the processing order of the innate operation system.

FIG. 24 shows the dialog rules relating to the switching on of the entrance light.

FIG. 26 shows the dialog rules relating to the clocks.

FIG. 28 shows the dialog rules relating to the bath.

FIG. 30 shows the dialog rules relating to the informator, video recorder, and telephone.

FIG. 31 shows the dialog rules relating to the informator, video recorder, and telephone.

FIG. 33 shows the dialog rules relating to the closet.

FIG. 35 shows the dialog rules relating to the cleaning robots.

FIG. 37 shows the dialog rules relating to the guide-robot and the navigator.

FIG. 38 shows the dialog rules relating to the guide-robot and the navigator.

DESCRIPTION OF THE PREFERRED EMBODIMENT

The present invention provides a practical system using the above-described TDI to enable interaction by speech not only between a human and a thing, but also among fellow things.

Figure 4:
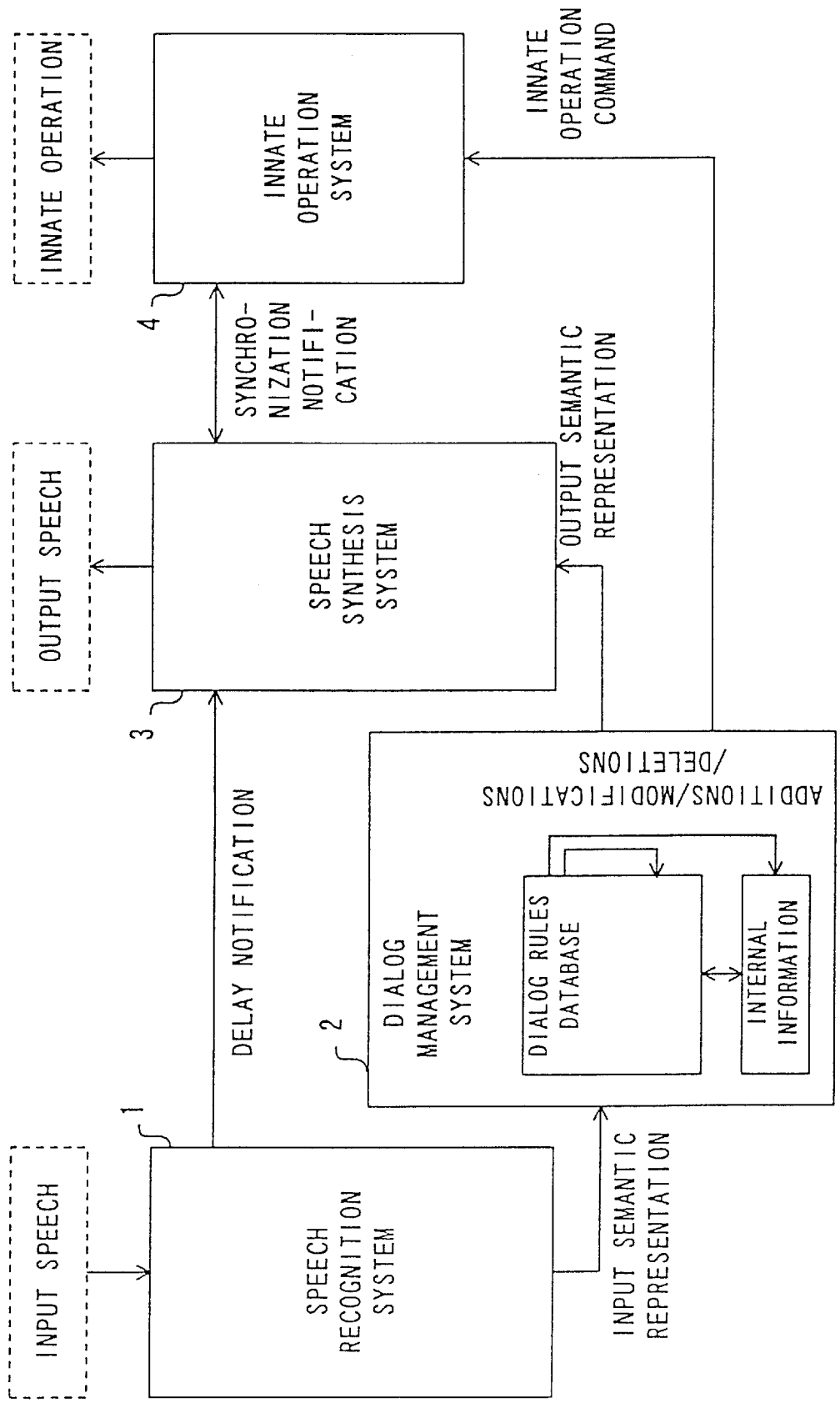
FIG. 4 discloses the configuration of the interface system according to the present invention FIG. 5 discloses the functional structure of an illustrative embodiment of the TDI system according to the present invention.

FIG. 4 is the principle configuration of the present invention. In this figure, a speech recognition system 1 converts input speech to an input semantic representation. A dialog management system 2 outputs an output semantic representation corresponding to an input semantic representation received from the speech recognition system 1 and an innate operation command, based on the dialog rules. A speech synthesis system 3 receives the output semantic representation from the dialog management system 2, converts that output semantic representation to output speech, and outputs that output speech. An innate operation system 4 receives the innate operation command from the dialog management system 2 and executes that operation.

In the present invention, the output speech responsive to the input speech is produced based on the dialog rules, and a dialog is accomplished between a human and a thing, as well as among fellow things. A prescribed process responsive to the content of the dialog, or a prescribed operation, is executed.

The simultaneous initiation of dialog can be avoided in the present system, by establishing in the speech recognition system 1 a function that sends out a delay notification to the speech synthesis system 3 when speech is being inputted.

Similarly, it is possible to make the system autonomous, by establishing in the dialog management system 2 functions for changing, adding, and deleting dialog rules pursuant to commands from other humans or things, or from the system itself.

Further, it is possible to avoid identical conversations, by establishing in the dialog management system 3 a function that dismisses one of two input semantic representations, when one of two successive input semantic representations and the output semantic representation corresponding to the other input semantic representation are identical.

Similarly, it is possible to carry out synchronously the production of speech and the execution of an innate operation, by establishing in the speech synthesis system 3 and the innate operation system 4 a function that mutually outputs a synchronization notification.

The preferred embodiment of the present invention is hereunder explained. Here, any one thing in which TDI is employed (for example, computers, robots, industrial machinery, electrical appliances, daily goods, and the like, hereinafter, to make contrast with "a human" are referred to as "things".) is referred to as a TDI system, in order to draw a distinction between such things and humans.

[The Functional Configuration and Processing Order of the TDI System]

Figure 5:
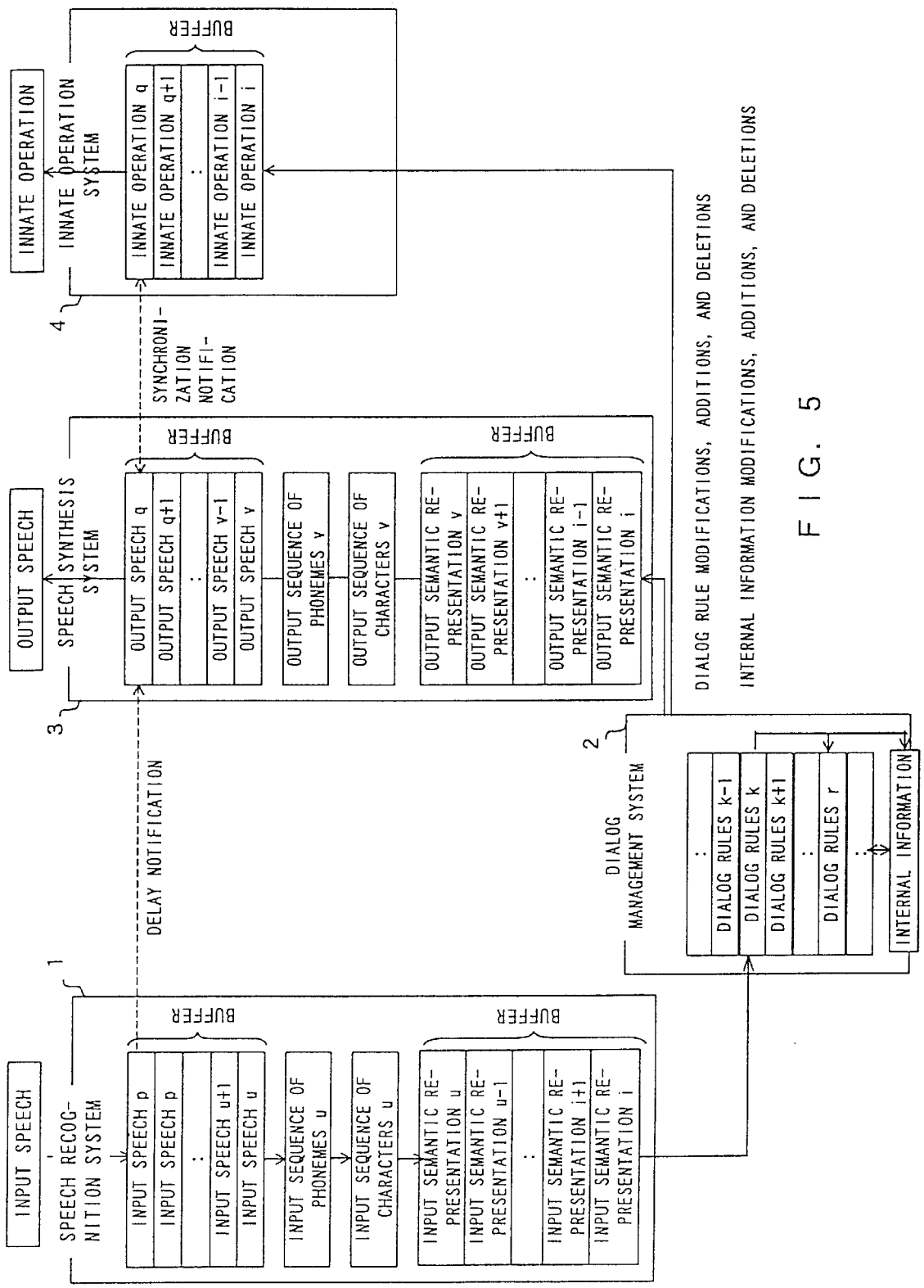

FIG. 5 discloses the functional configuration of the TDI system of this illustrative embodiment. This figure represents an instance in which the TDI is employed in one thing.

As is shown in this figure, the TDI system is made up of three systems, namely, a speech recognition system 1, a dialog management system 2, and a speech synthesis system 3. Further, the TDI system also comprises, as necessity demands, an innate operation system 4 for executing an operation, or operations, peculiar to that thing. This innate operation system 4 may include, illustratively, a recording function and a playback function, in the case of a video recorder.

Figure 6:
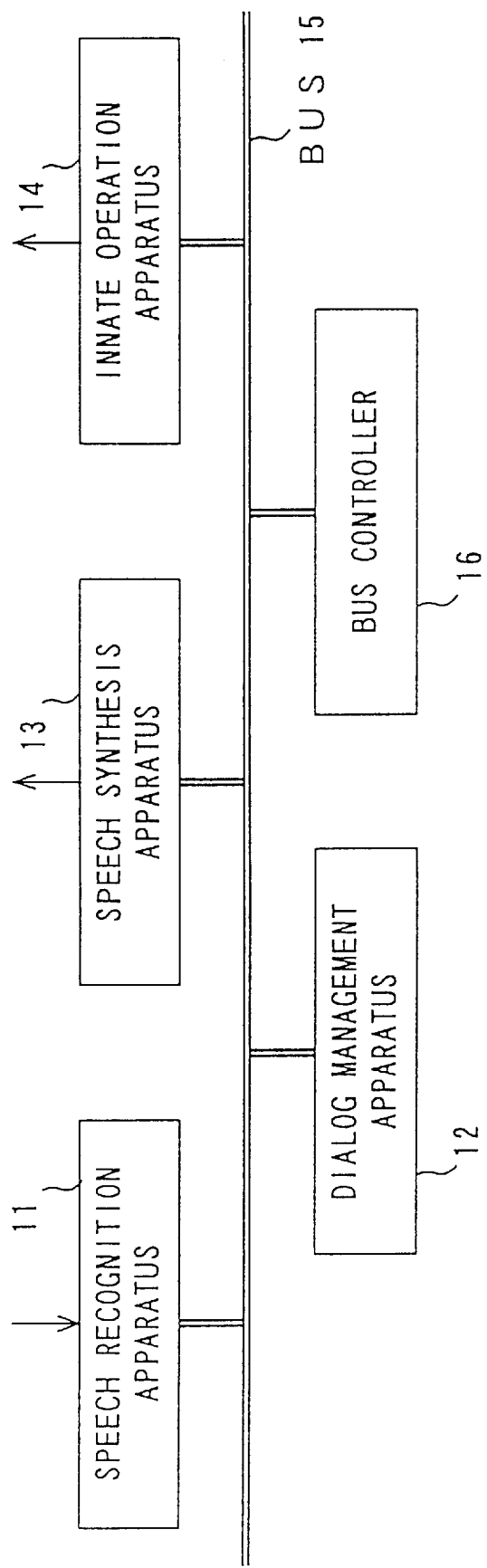
FIG. 6 discloses the configuration of the TDI system according to the present invention.

FIG. 6 discloses a summary of the hardware configuration for the TDI system.

As is shown in this figure, a speech recognition apparatus 11, a dialog management apparatus 12, a speech synthesis apparatus 13, and an innate operation apparatus 14 (corresponding respectively to the speech recognition system 1, the dialog management system 2, the speech synthesis system 3, and the innate operation system 4), which collectively constitute the TDI system, are coupled by a bus 15, to which has been added a bus controller 16 to control the bus 15. Further, the speech recognition apparatus 11, the dialog management apparatus 12, the speech synthesis apparatus 13, and the innate operation apparatus 14 are configured respectively according to hardware like that which is shown for illustrative purposes in FIG. 7. Specifically, each of the preceding systems comprises an input/output apparatus 21, an operation apparatus 22, a storage apparatus 23, and an interface 25. These are linked by means of an internal bus 26. To these, also, is added a bus controller 24 to control the internal bus 26.

The input/output apparatus 21 comprises a microphone, a speaker, and a signal processing apparatus. The operation apparatus 22 is, illustratively, a CPU, and may comprise a bus controller 24. The storage apparatus 23 is, illustratively, a semiconductor memory apparatus or a magnetic disk apparatus. The interface 25 comprises a buffer, which is required when joining the buses.

Figure 8:
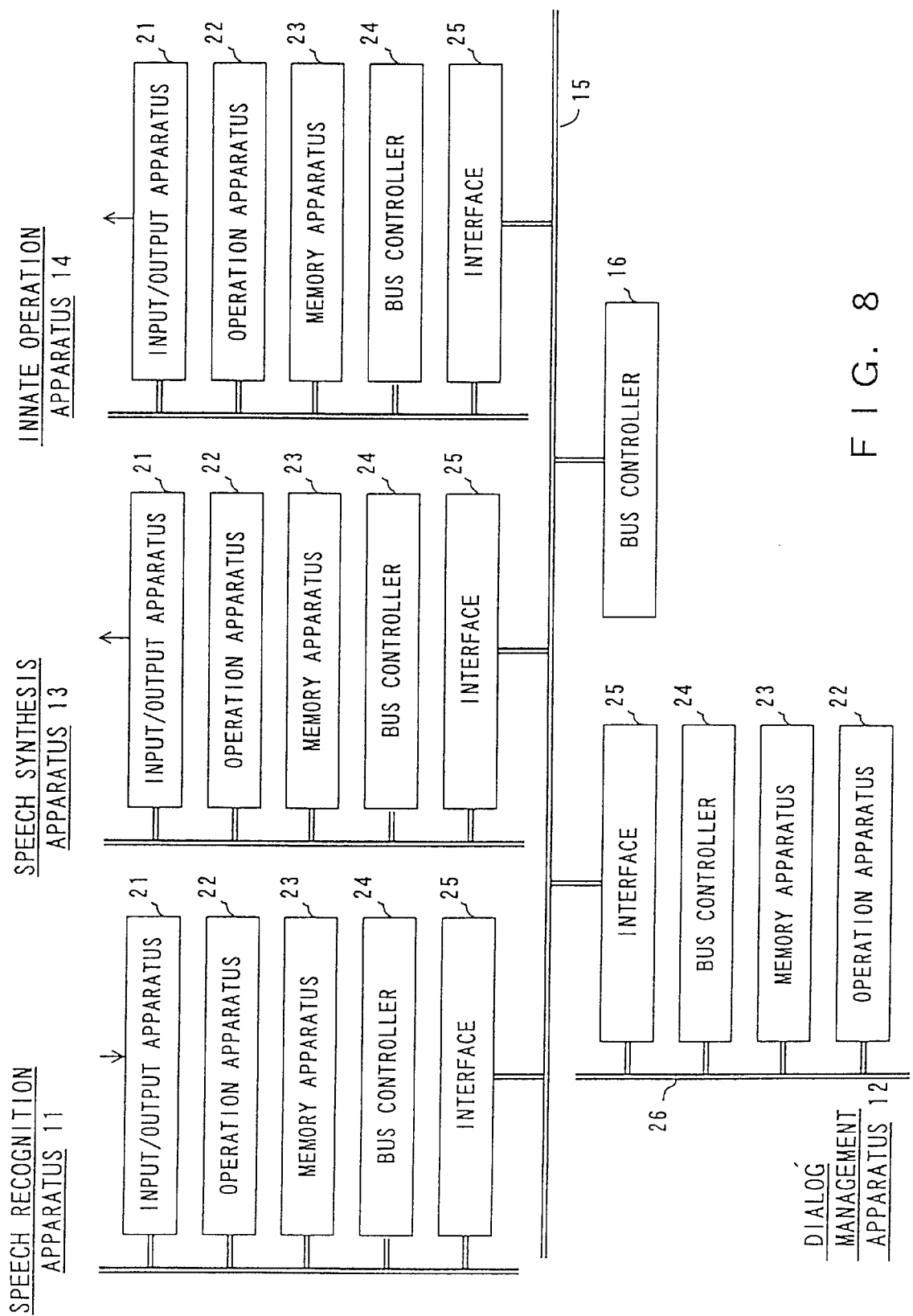
FIG. 8 discloses the details of the hardware configuration for the TDI system according to present invention.

Specifically, the TDI system hardware configuration shown in FIG. 6 can be rewritten, as is shown in FIG. 8.

Figure 9:
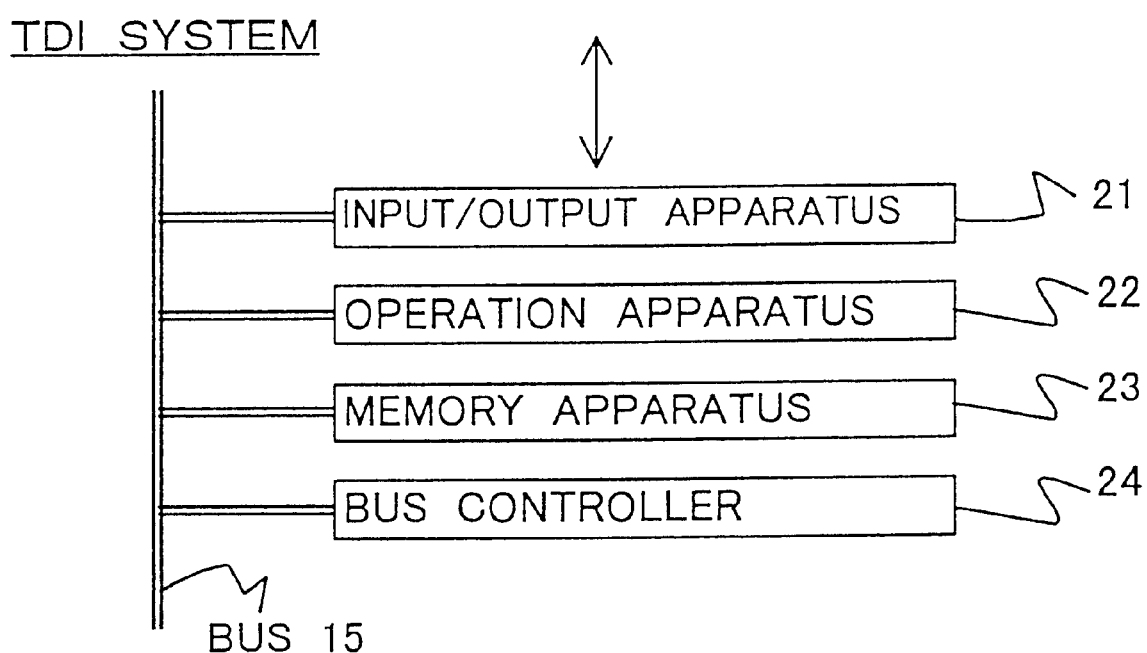
FIG. 9 discloses the integrated hardware configuration for the TDI system according to the present invention.

Realistically, it is possible to integrate several of the same hardware parts into a single element, according to performance and price. The hardware configuration for the most highly integrated embodiment of the TDI system is as depicted in FIG. 9.

The operation of the speech recognition system 1, the dialog management system 2, the speech synthesis system 3, and the innate operation system 4 are hereunder explained.

(1-1) The Speech Recognition System

The speech recognition system 1 receives input speech from a distinct entity consisting of a human or a TDI system and converts it, through a number of the following processes, to an input semantic representation, and, ultimately, transmits that input semantic representation to the dialog management system.

The input speech is stored in the buffer and, thereafter, is converted to an input sequence of phonemes, an input sequence of characters, and an input semantic representation, in first-in-first-out (FIFO) order.

Here, a phoneme is the basic unit of speech. Several inputted speech is broken down into time series of phonemes. The sequence of phonemes is further converted to a character sequence, that character sequence is structurally analyzed, and then converted to a formal semantic representation. The input semantic representations are ultimately transmitted in order to the dialog management system. The conversion from speech to semantic representation is the same as the conventional technique (see, for example, Sadaoki Furui "Speech Recognition", (in Japanese), The Journal of the Institute of Electronics, Information and Communication Engineers, vol. 78, no. 11, pp. 1114–1118, November, 1995).

While the speech recognition system 1 is receiving the input speech, a delay notification is sent out from the speech recognition system 1 to the speech synthesis system 3. The speech synthesis system 3 brings about a delay in the transmission of the output speech by issuing the command "delay output during input speech". This is done to ensure, at a minimum, that one thing does not attempt to initiate a dialog while someone or some other thing is already in the process of having a dialog.

Figure 11:
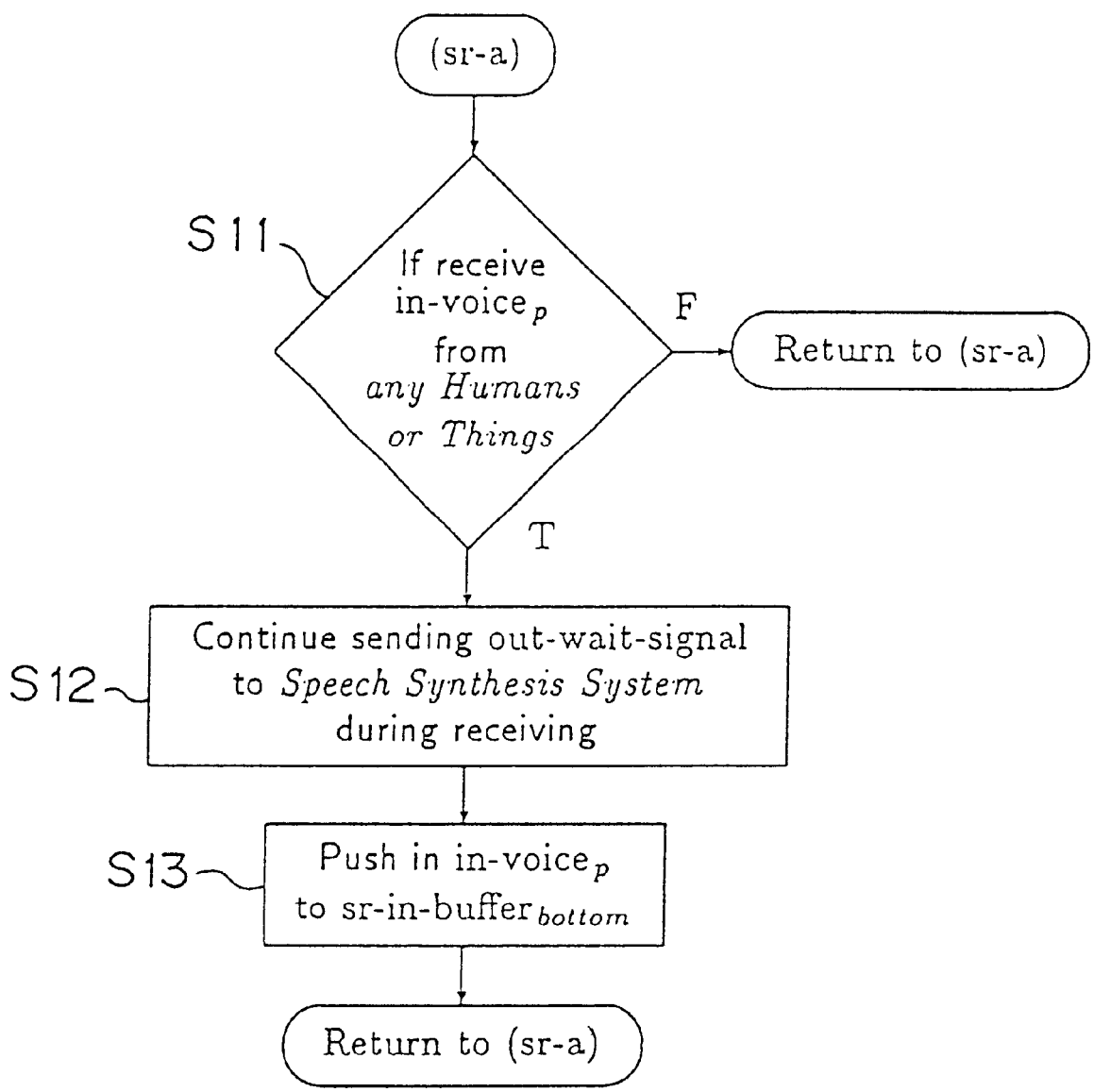
FIG. 11 is a flowchart depicting the first process of the speech recognition system.
Figure 12:
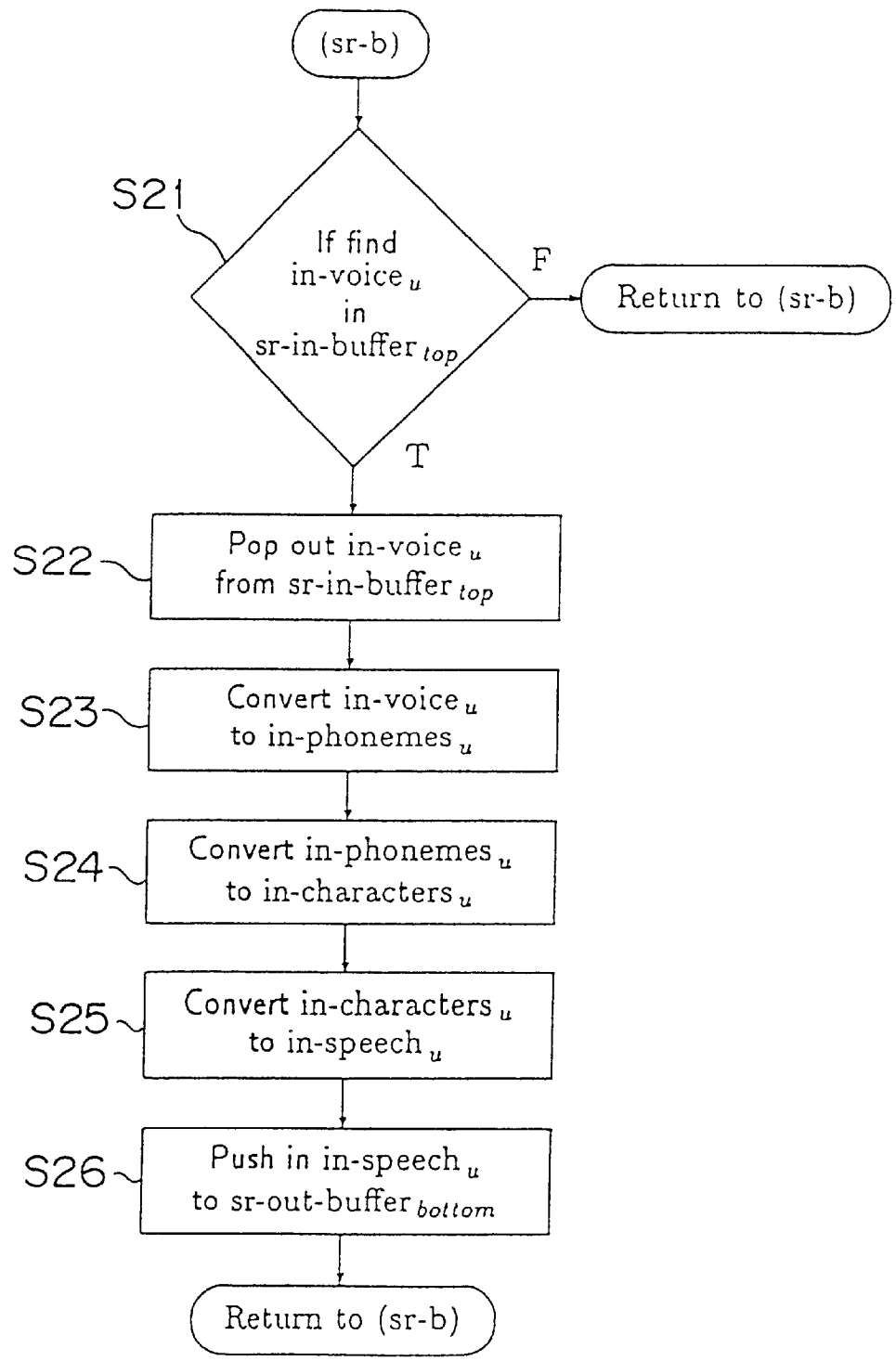
FIG. 12 is a flowchart depicting the second process of the speech recognition system.

FIG. 10 shows the processing order for the speech recognition system 1. FIGS. 11 and 12 depict the flow for that processing.

In FIGS. 10 through 12, the in-voice$_u$, in-phonemes$_u$, in-character$_u$, and in-speech$_u$ represent respectively the u$^{th}$ input speech, the input sequence of phonemes, the input sequence of characters, and the input semantic representation. The sr-in-buffer$_{top}$ and sr-in-buffer$_{bottom}$ represent the top and the bottom, respectively, of the input buffer, and the sr-out-buffer$_{top}$ and sr-out-buffer$_{bottom}$ represent respectively the top and the bottom of the output buffer. The input buffer and the output buffer can be combined in one buffer. The processes a and b shown in FIG. 10 can be carried out in parallel.

FIG. 11 is a flowchart depicting the speech recognition processing that is represented in the process a of FIG. 10.

In process a (sr-a), while speech is being inputted from a human or from a thing (step S11:T), the speech recognition system 1 continues to output to the speech synthesis system 3 an out-wait signal (step S12) and executes a "push-in" process (step S13) that pushes the in-voice$_u$ to the bottom of the input buffer for the speech recognition system 1.

FIG. 12 is a flowchart depicting the speech recognition processing shown in the process b in FIG. 10.

When the in-voice$_u$ is at the top of the input buffer (step S21:T), process b (sr-b) outputs the input speech (in-voice$_u$) out from the input buffer (step S22), converts the input speech to an input sequence of phonemes (in-phonemes$_u$) (step S23), and further converts the input sequence of phonemes to an input sequence of characters (in-character$_u$) (step S24). The input sequence of characters (in-character$_u$) is further converted to an input semantic representation (in-speech$_u$) (step S25) and pushed in to the bottom of the output buffer (step S26). The preceding processes are repeated during the interval in which input speech is being inputted.

(1-2) The Dialog Management System

The dialog management system 2 receives the input semantic representation from the speech recognition system 1, searches in the dialog database for the appropriate rules respecting the input semantic representation, outputs to the speech synthesis system 3 the output semantic representation based on the input semantic representation, and issues to the innate operation system 4 an order for an innate operation. As is hereinbelow explained, the dialog management system 2 comprises a function for updating and storing date, time, and like environmental variables as internal information. Further, the dialog management system 2 comprises a function for changing, adding, or deleting dialog rule according to a command issued by another entity, by a human or a thing, or by the dialog management system 2 itself.

In this illustrative embodiment, all conversational semantic representations are described as follows.

speech=[(from-whom), to-whom, message]

Here, "from-whom", "to-whom", and "message" mean respectively: by whom or by what the conversation is initiated; to whom or to what the conversation is directed; and to what kind of content the conversation pertains.

"From-whom" is enclosed in parentheses because sometimes the speaker does not positively communicate that it is the speaker who, or which, initiates the dialog. For this reason, it is assumed for purposes of this explanation, that, if necessary, the TDI comprises a function that is able to identify from speech quality, for example, who or what is the initiator of that conversation (see "Speech Recognition", cited above).

On the other hand, when "to-whom" is not positively specified in the dialog, this explanation assumes the "to-whom" content to be "anyone". It is possible also to make the "to-whom" content "everyone", in which case, the speaker must positively make this designation.

According to the above explanation, the i$^{th}$ input semantic representation is in the discussion below described as follows.

in-speech$_i$=[(in-from-whom$_i$), in-to-whom$_i$, in-message$_i$]

Likewise, the j$^{th}$ output semantic representation is described as follows.

out-speech$_j$=[(out-from-whom$_j$), out-to-whom$_j$, out-message$_j$]

Next, the specification defines the dialog rules. In this illustrative embodiment, the k$^{th}$ dialog rule in the dialog rules database is described as shown in FIG. 13.

The "name-of-thing" in FIG. 13 is the name of the thing in which the TDI is employed. The symbol "→" represents a logical deduction. The dialog rules database is defined as the set of dialog rules shown in FIG. 13.

Specifically, as is shown in FIG. 13, the set of dialog rules defining the output semantic representation (out-speech$_k$) and the innate operation (innate-operation$_k$), with respect to an input semantic representation (in-speech$_k$), is stored in the dialog rules database.

Figure 15:
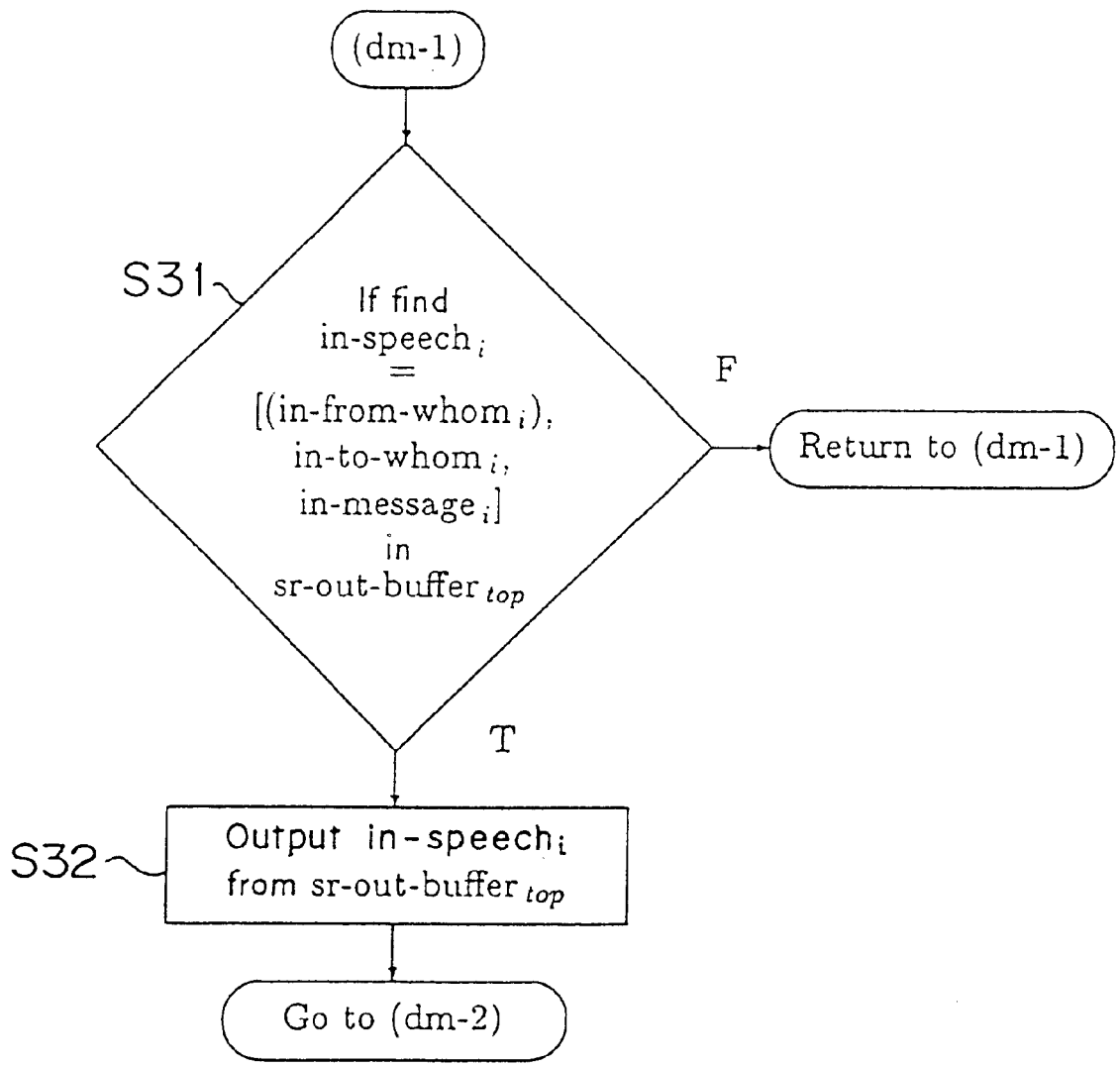
FIG. 15 is a flowchart depicting the first process of the dialog management system.
Figure 16:
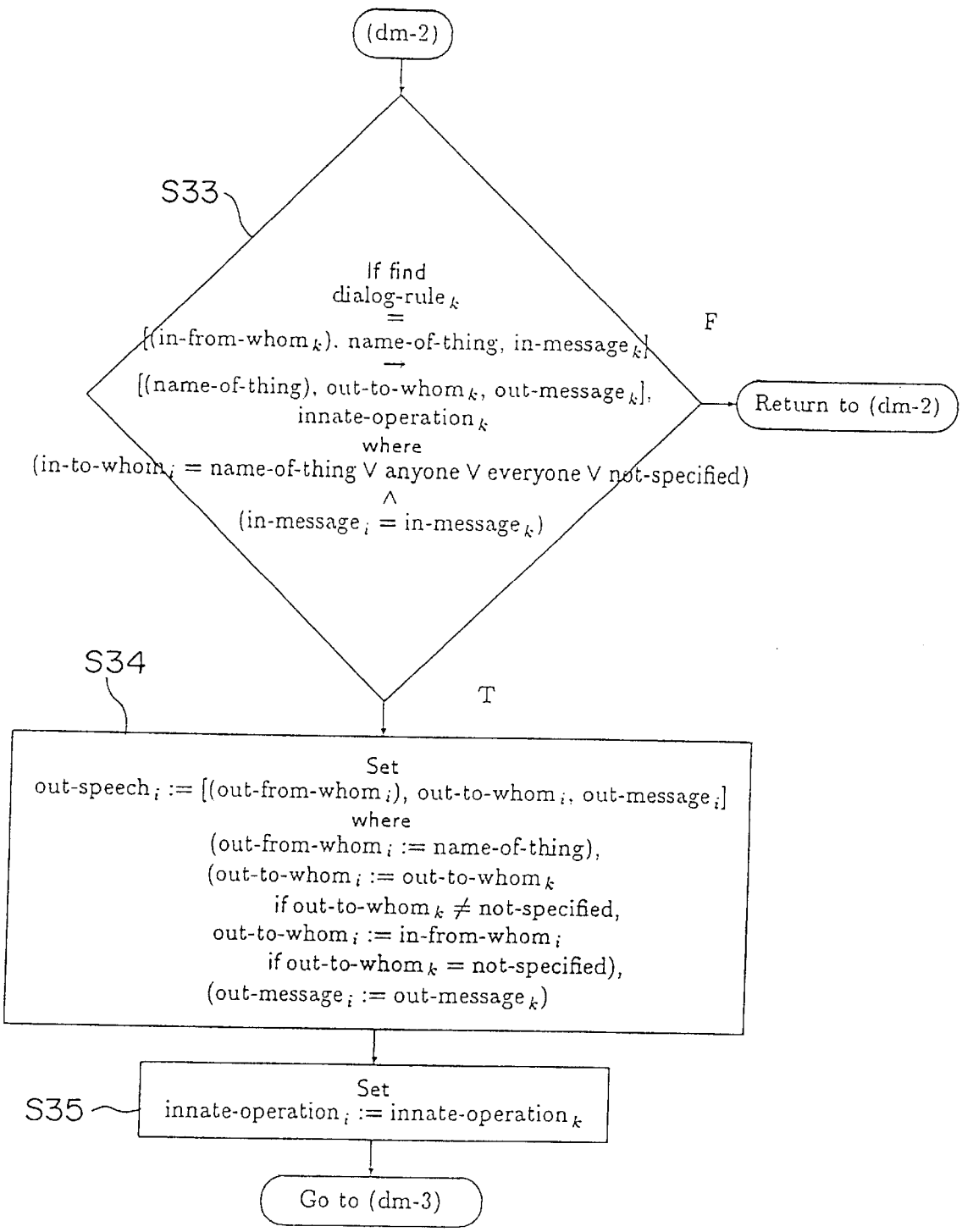
FIG. 16 is a flowchart depicting the second process of the dialog management system.
Figure 17:
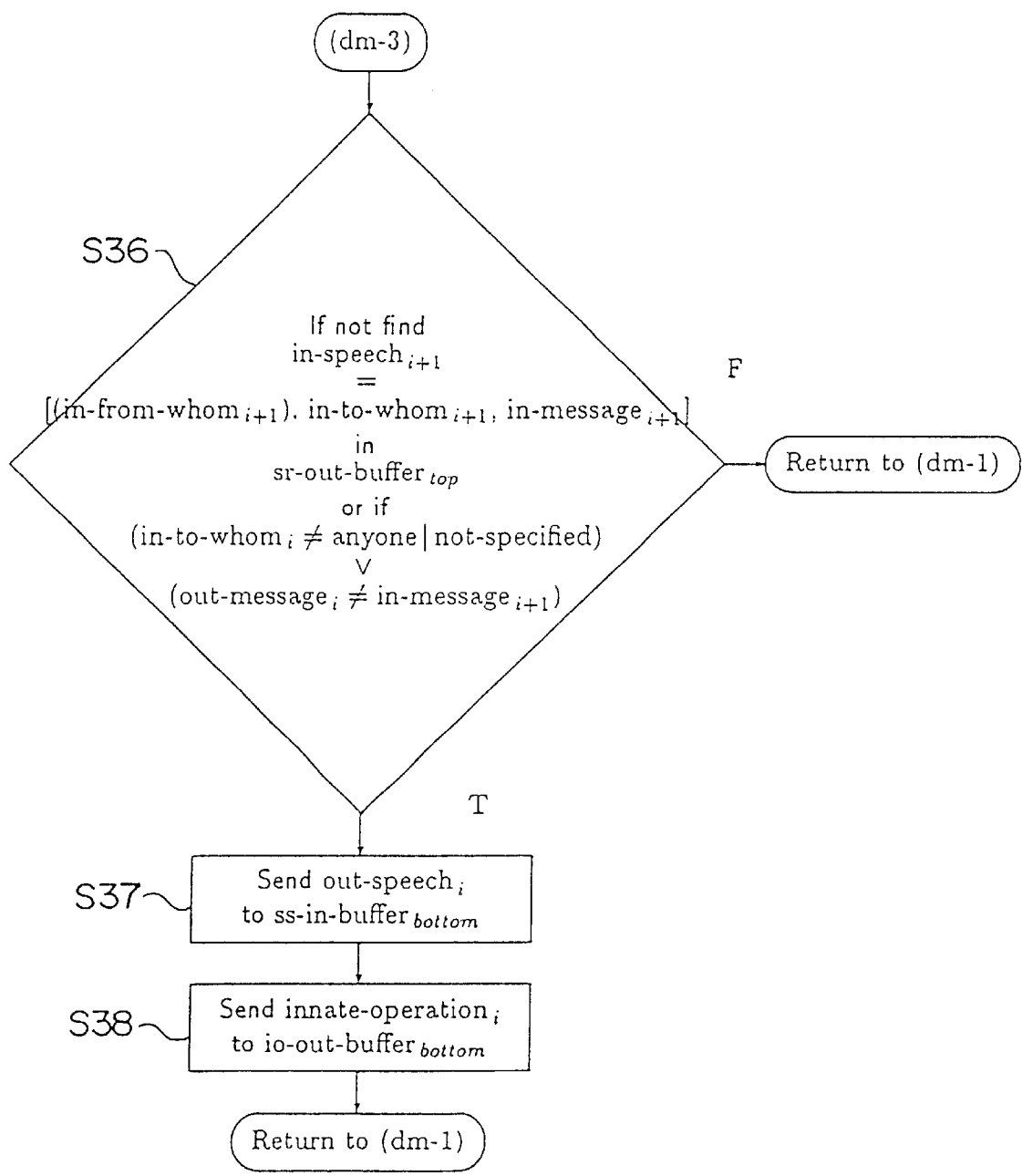
FIG. 17 is a flowchart depicting the third process of the dialog management system.

FIG. 14 discloses the processing order of the dialog management system 2, and FIGS. 15 through 17 show the processing flow therefor.

In FIGS. 14 through 17, the symbols "∧", "∨", and "|" represent respectively (AND), (OR), and (NOR). The processes 1, 2, and 3 in FIGS. 15 through 17 are carried out in sequence.

FIGS. 15, 16, and 17 are flowcharts that depict respectively the dialog management system disclosed in the processing orders 1, 2, and 3, shown in FIG. 14.

As shown in FIG. 15, when an input semantic representation (in-speech$_i$) exists in the output buffer of the speech recognition system 1 (step S31:T), the input semantic representation (in-speech$_i$) is output from the top of the output buffer (step S32) in processing order 1 (dm-1).

Next, in processing order 2 (dm-2), also shown in FIG. 16, the dialog rules (dialog-rule$_k$) are searched (step S33), and the output semantic representation (out-speech$_i$) corresponding to the input semantic representation (in-speech$_i$), is determined based on the dialog rules (step S34). Further, an innate operation (innate-operation$_i$) is established (step S35).

Here, the "in-to-whom" can be any one of "name-of-thing" (i.e., the thing in which the TDI is employed), "anyone", "everyone", or "not-specified". Similarly, the "out-from-whom$_i$" (the thing or human initiating the speech) is the "name-of-thing" (i.e., the thing in which the TDI is employed), and the "out-to-whom$_i$" (the counterpart with respect to whom or to which the dialog is initiated) is taken to be "out-to-whom$_k$", where out-to-whom$_k$ is specified, and is taken to be in-from-whom$_j$, where out-to-whom$_k$ is not specified.

Next, in processing order 3 (dm-3), shown in FIG. 17, the out-speech$_i$ is sent out to the bottom of the speech synthesis system 3 (step S37), when the next input semantic representation (in-speech$_{i+1}$) is not in the top of the output buffer for the speech recognition system 1, or when the in-to-whom$_i$ is neither anyone nor not specified and the in-message$_{i+1}$ is not equal to the candidate out-message$_i$ for the output semantic representation (step S36:T). Additionally, an innate-operation$_i$ is sent out to the bottom of the buffer for the innate operation system 3 (step S38).

In step S36, the candidate message$_i$ for the $i^{th}$ output semantic representation is compared with the next output semantic representation, namely, the $i+1_{th}$ output semantic representation, which is recognized in the speech recognition system 1, and, if both of the semantic representations are the same, the input semantic representation in-message$_{i+1}$ is dismissed. Thus, the duplication by a single thing or by a plurality of things of a conversation with the same content is avoided.

(1-3) The Speech Synthesis System

The speech synthesis system 3 possesses the converse functions of the speech recognition system 1. The speech synthesis system 3 receives the output semantic representation from the dialog management system 2, through several processes converts the output semantic representation to output speech, and, ultimately, transmits that output speech to one or plural humans and/or things furnished with the TDI.

The output semantic representation is converted to an output sequence of characters, an output sequence of phonemes, and output speech and is stored in the buffer. The output speech ultimately obtained is transmitted, in FIFO order, to one or plural humans and/or things furnished with a TDI. Furthermore, the conversion from the semantic representation to the speech is accomplished according to the conventional method (see, for example, Kazuo Nakata, "Speech Synthesis and Coding", (in Japanese), The Journal of the Institute of Electronics, Information and Communication Engineers, vol. 78, no. 11, pp. 1119–1124, November, 1195).

Figure 19:
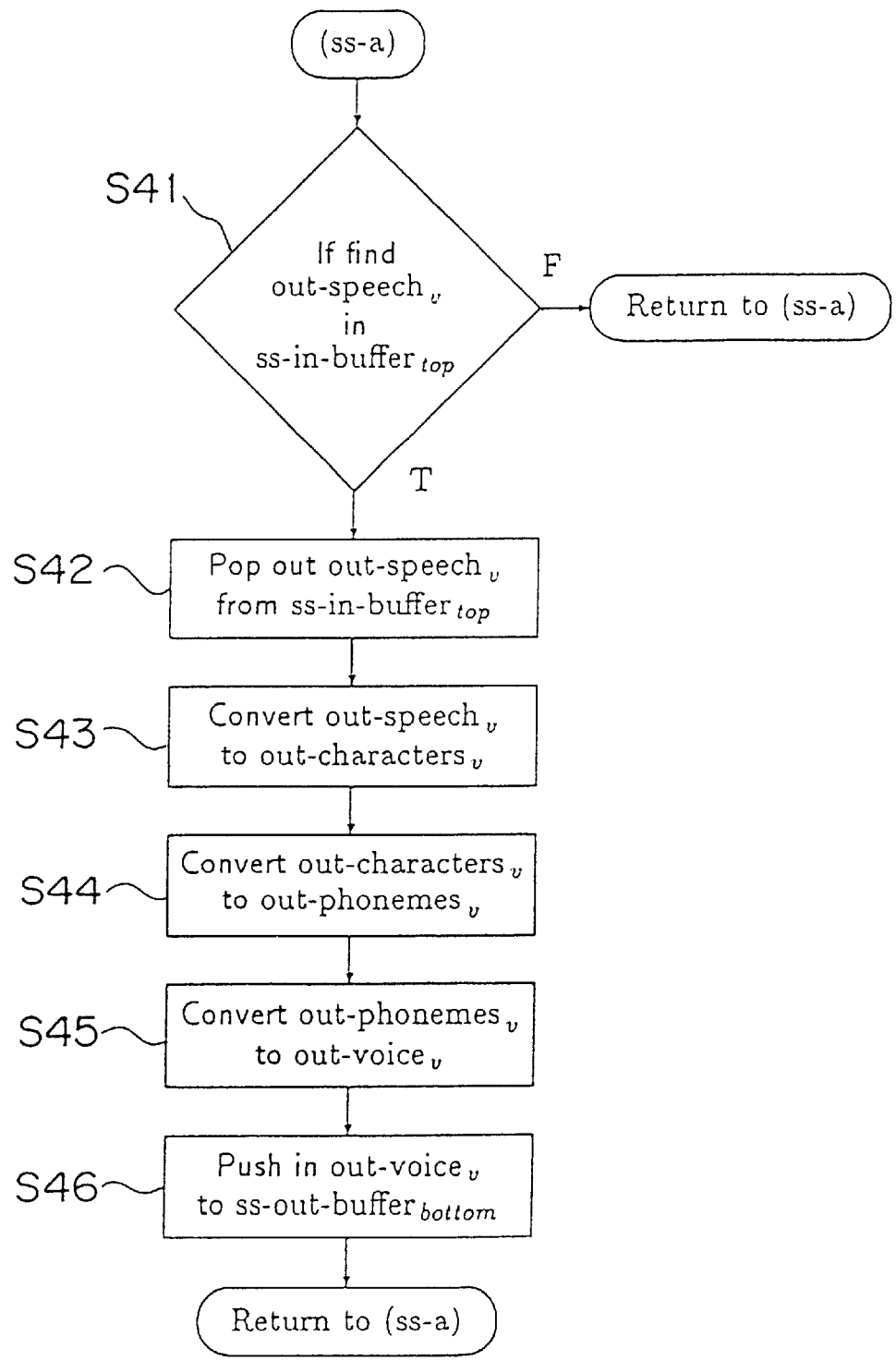
FIG. 19 is a flowchart depicting the first process of the speech synthesis system.
Figure 20:
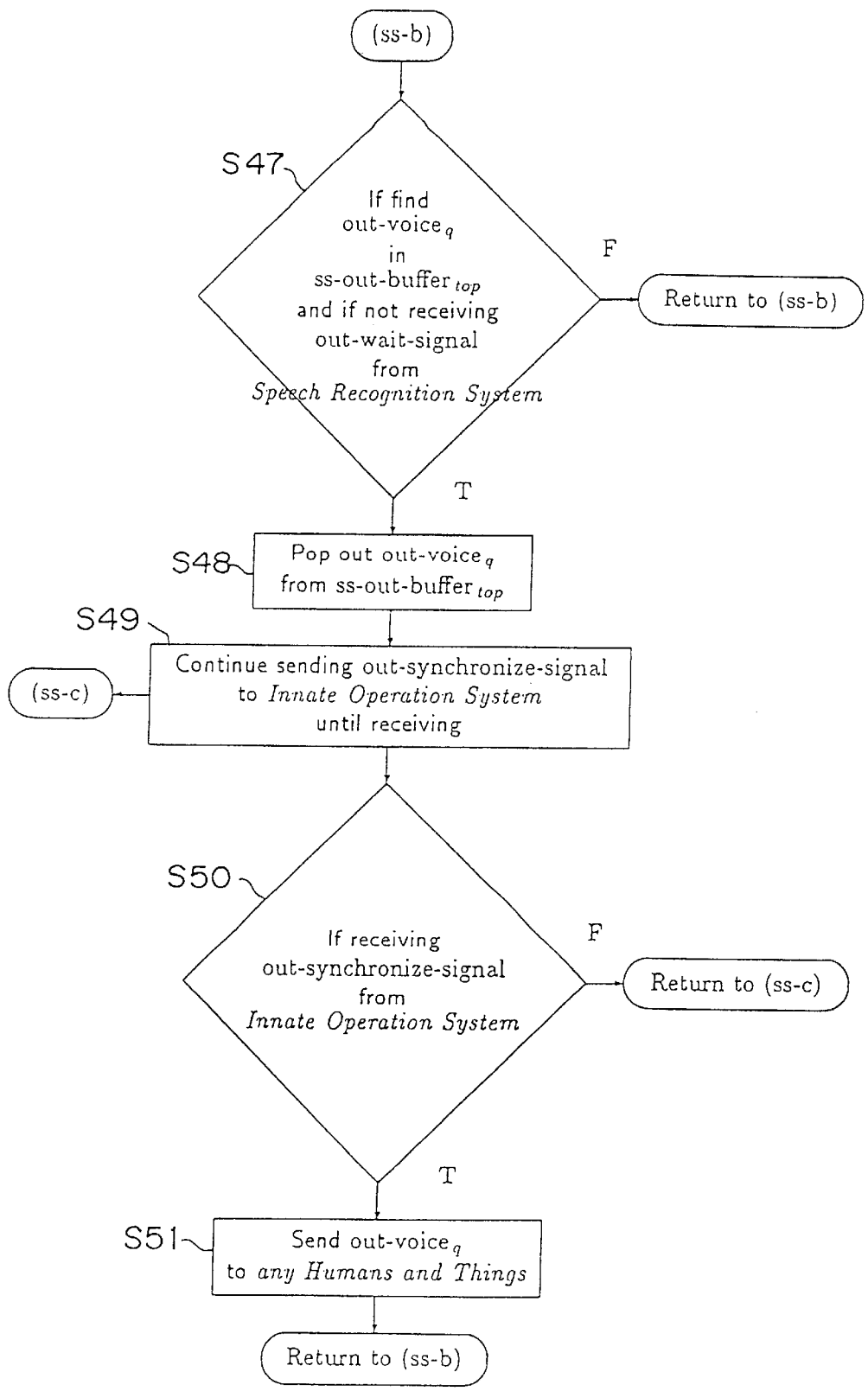
FIG. 20 is a flowchart depicting the second process of the speech synthesis system.

FIG. 18 discloses the processing order of the speech synthesis system 3. FIGS. 19 and 20 show the processing therefor.

The "out-speech$_v$", "out-characters$_v$", "out-phonemes$_v$" and "out-voice$_v$" in FIGS. 18, 19, and 20 represent respectively the $v^{th}$ output semantic representation, the output sequence of characters, the output sequence of phonemes, and the output speech. The "ss-in-buffer$_{top}$" and "ss-in-buffer$_{bottom}$" represent respectively the top and the bottom of the input buffer for the speech synthesis system 3, and the "ss-out-buffer$_{top}$" and "ss-out-buffer$_{bottom}$" represent respectively the top and the bottom of the output buffer. The input buffer and the output buffer can be combined in one buffer.

The out-voice$_q$ is in an output standby state while the out-wait-signal (waiting signal) is being received from the speech synthesis system 2. Similarly, the output of the out-voice$_q$ is synchronized with the execution of the innate-operation$_q$ of the innate operation system 4. The process sequence a and the process sequence b, both shown in FIG. 18, can be carried out in parallel.

FIG. 19 is a flowchart depicting the speech synthesis processes shown in the processing order a of FIG. 18.

In processing order a (ss-a), if there is an output semantic representation (out-voice$_v$) in the top of the buffer for the speech synthesis system 3 (step S41:T), that output semantic representation (out-speech$_v$) is popped out from the buffer (step S42) and converted to a sequence of output characters (out-characters$_v$) (step S43). The sequence of output characters (out-character$_v$) is then converted to a string of output phonemes (out-phonemes$_v$) (step S44). The string of output phonemes (out-phonemes$_v$) is converted to output speech (out-voice$_v$) (step S45) and pushed into the bottom of the buffer (step S46). The process then returns to step S41.

FIG. 20 is a flowchart that represents the speech synthesis system processing disclosed in the processing order b and the processing order c of FIG. 18.

In processing order b (ss-b), if there is output speech (out-voice$_q$) in the top of the buffer for the speech synthesis system 3, and if a waiting signal (out-wait-signal) has not been received from the speech recognition system 1 (step S47:T), the output speech (out-voice$_q$) is popped out from the buffer (step S48).

In processing order c (ss-c), the system continues to send a synchronization signal (out-synchronize-signal) to the innate operation system 4 (step S49), and when the synchronization signal is received from the innate operation system 4 (step S50:T), the output voice (out-voice$_q$) is outputted to a human or to a thing (step S51).

(1-4) The Innate Operation System

The innate operation system 4 receives the innate operation (specifically, the command therefor) from the dialog management system 2 and executes that innate operation. Here, an "innate operation" would, in the illustrative instance of a video tape recorder, correspond to the functions of record and playback.

The processing order for the innate operation system 4 is disclosed in FIG. 21 and can be described as is shown in FIG. 21.

Here, the "innate-operation$_q$" expresses the $q^{th}$ innate operation. The "io-out-buffer$_{top}$" and "io-out-buffer$_{bottom}$" represent respectively the top and the bottom of the output buffer for the innate operation system 4. The execution of the innate operation$_q$ is synchronized with the output of the out-voice$_q$.

Figure 22:
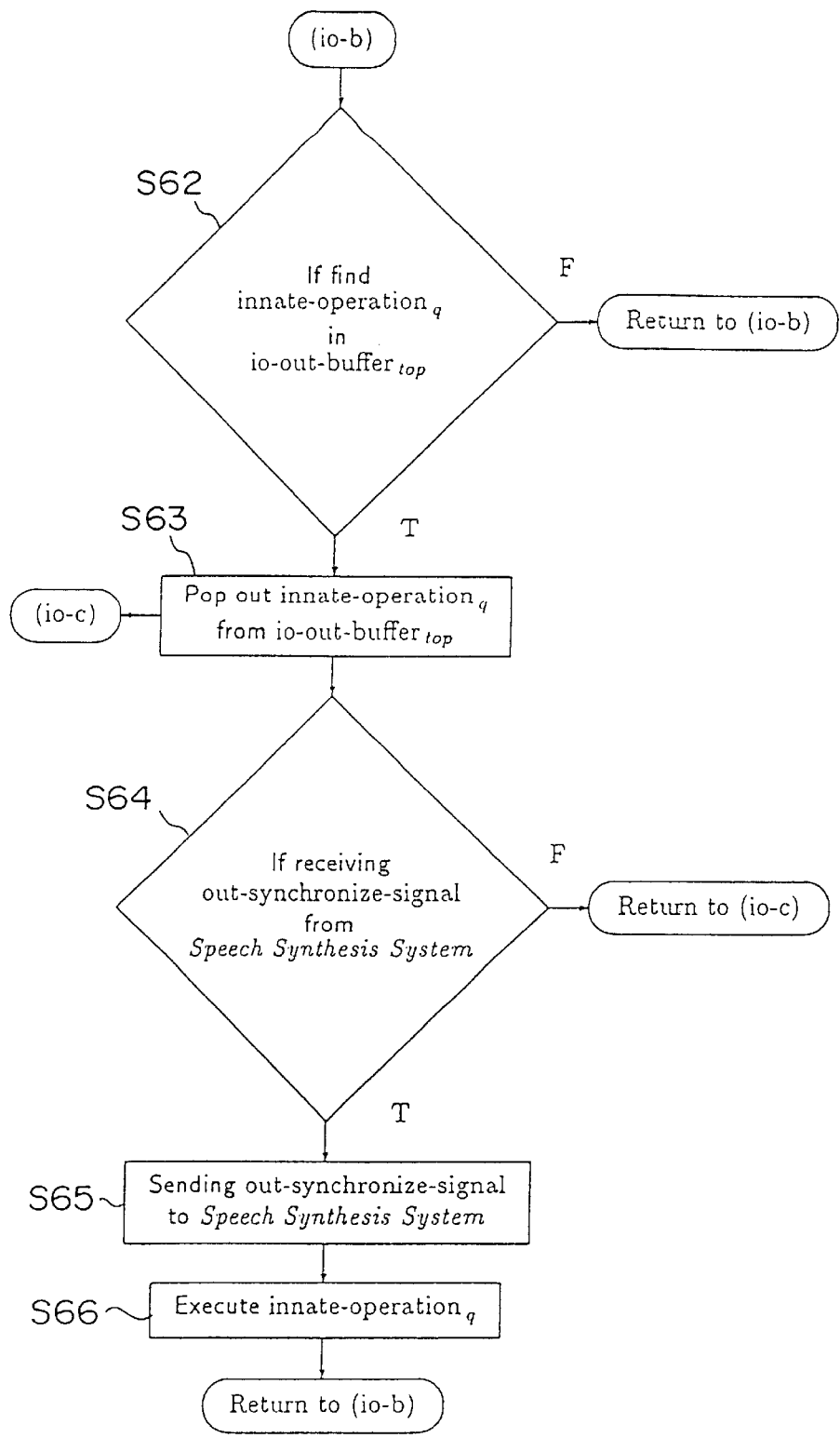
FIG. 22 is a flowchart depicting the processes of the innate operation system.

FIG. 22 is a flowchart describing the processes of the innate operation system 4 shown in the processing order b and the processing order c of FIG. 21.

In processing order b (io-b), first, if there is an innate operation (innate-operation$_q$) in the buffer for the innate operation system 4 (step S62:T), that innate-operation$_q$ is popped out from the buffer (step S63). If a synchronization signal (out-synchronize-signal) has in processing order c (io-c) been received from the speech synthesis system 3 (step S64:T), the synchronization signal is sent to the speech synthesis system 3 (step S65), and the innate operation (innate-operation$_q$) is executed (step S66). These processes are carried out repetitively.

[The Features of the TDI System]

Next, the disclosure explains the features of the TDI system contemplated by the present invention.

(2-1) The Specification and Non-specification of a Dialog Target

In the TDI system, it is possible to undertake both dialog with a specified target and dialog without a specified target.

An example of the former would be "reserve recording of program ABC!", in the case of a video recorder. Illustrative of the latter, on the other hand, would be "(someone), tell me the time!". In this case, those things possessed of compliant dialog rules would become response candidates. According to the "redundant conversation avoidance" feature described above in (1-2), however, only those things with the fastest reactions would reply.

A dialog in which no target is specified is one type of a so called "broadcast." This kind of dialog takes advantage of the fact that speech has a spatial expanse.

(2-2) The Avoidance of Simultaneous Dialog Initiation

The TDI system of the present invention is arranged to ensure at a minimum that, while someone or something is in the process of initiating a dialog, no other thing will initiate a dialog. As explained above in (1-1) and (1-3), this is accomplished by means of the buffer function in both the speech synthesis system and the innate operation system, and by having the speech recognition system command the speech synthesis system to delay output during any interval in which the speech recognition system is receiving input speech. The speech synthesis system is thus set to delay the transmission of the output speech.

(2-3) The Avoidance of Redundant Dialog

The TDI system of the present invention is set to prevent the duplication of conversations featuring the same content by a single thing or a plurality of things. This is accomplished as follows. As explained above in (1-2), the i$^{th}$ output semantic representation candidate message$_i$ is compared with the next input semantic representation derived in the speech recognition system, namely, the i+1$^{th}$ input semantic representation "in-message$_{i+1}$", and, if it is the same, it is dismissed.

(2-4) The Connection with Other Interfaces and Innate Operations

The role of the dialog management system is not limited to the transmission of an established output semantic representation to the speech synthesis system and the initiation of a dialog according to speech. The dialog management system also transmits an established innate operation to the innate operation system, indicates the substance of the response, and executes the operations peculiar to a given thing. Specifically, the TDI system is responsible for the verbal aspects of distinct interfaces. Non-verbal aspects like visual aspects, for instance, or operations that are innate to a given thing, or both, are coordinated and realized in the innate operation system.

(2-5) The Initiative of a Thing

In the TDI system of the present invention, it is possible to issue to a thing itself a question or a command in the form of a response from a distinct human or a distinct thing. Specifically, it is possible for a certain thing to issue to a human and/or other things a question or a command. Thus, a thing furnished with the TDI system possesses initiative. "Initiative", as herein used, means that a thing approaches others by its own intension.

(2-6) The Autonomy of a Thing

In the TDI system of the present invention, it is possible to direct, in the form of a command from either a human or a thing itself, or from a distinct human or a distinct thing, the addition of new dialog rules, the modification of existing dialog rules, or the deletion of obsolete dialog rules. Thus, a thing furnished with the TDI system possesses autonomy. Here "autonomy" means that a thing is autonomous, with respect to the outside world, while undertaking change within itself.

(2-7) The Simplicity of a Thing

Even where a plurality of unanticipated speech commands are inputted into the TDI system belonging to a certain thing, or where speech command intended for a distinct thing is inputted into the TDI system of that certain thing, the system simply renders no reaction, without producing an error. Thus, in the sense that the system reacts only to anticipated dialog rules, the system is simple.

(2-8) The Decentralization of the System

The groups of things in which the TDI system is employed are entirely decentralized. For this reason, the system is extremely flexible with respect to an increase or a decrease in participating humans or things. Although master/servant relationships are not present among the things, it is nevertheless feasible and simple to set the dialog rules for each thing so that a response is given only with respect to a command from a specific human or a specific thing.

(3) An Illustrative Application

Below, the disclosure illustrates particularized applications of the TDI system contemplated by the present invention. In order to simplify this explanation, without forfeiting generality, the from-whom items for both the in-speech and out-speech are omitted.

(3-1) The Turning On of an Entrance Light

Figure 23:
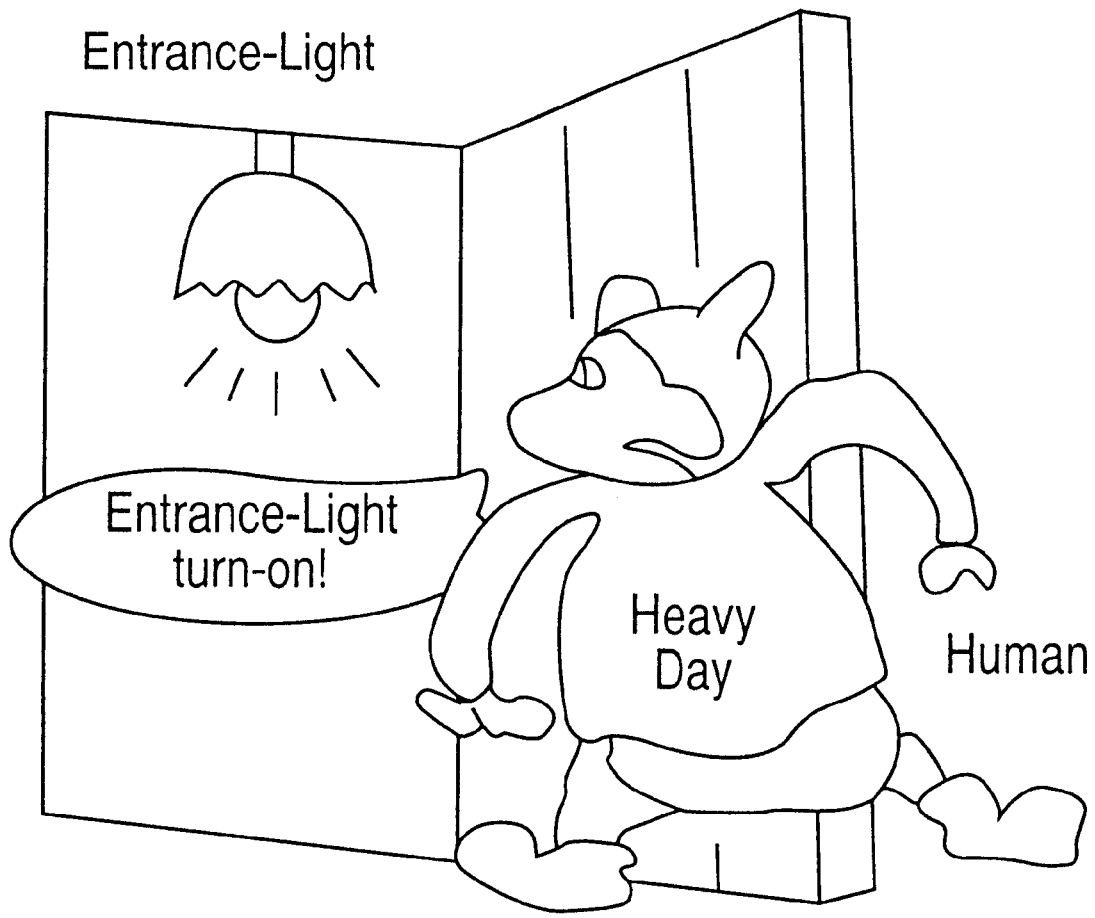
FIG. 23 shows an illustrative application of the present invention to an entrance light.
Figure 25:
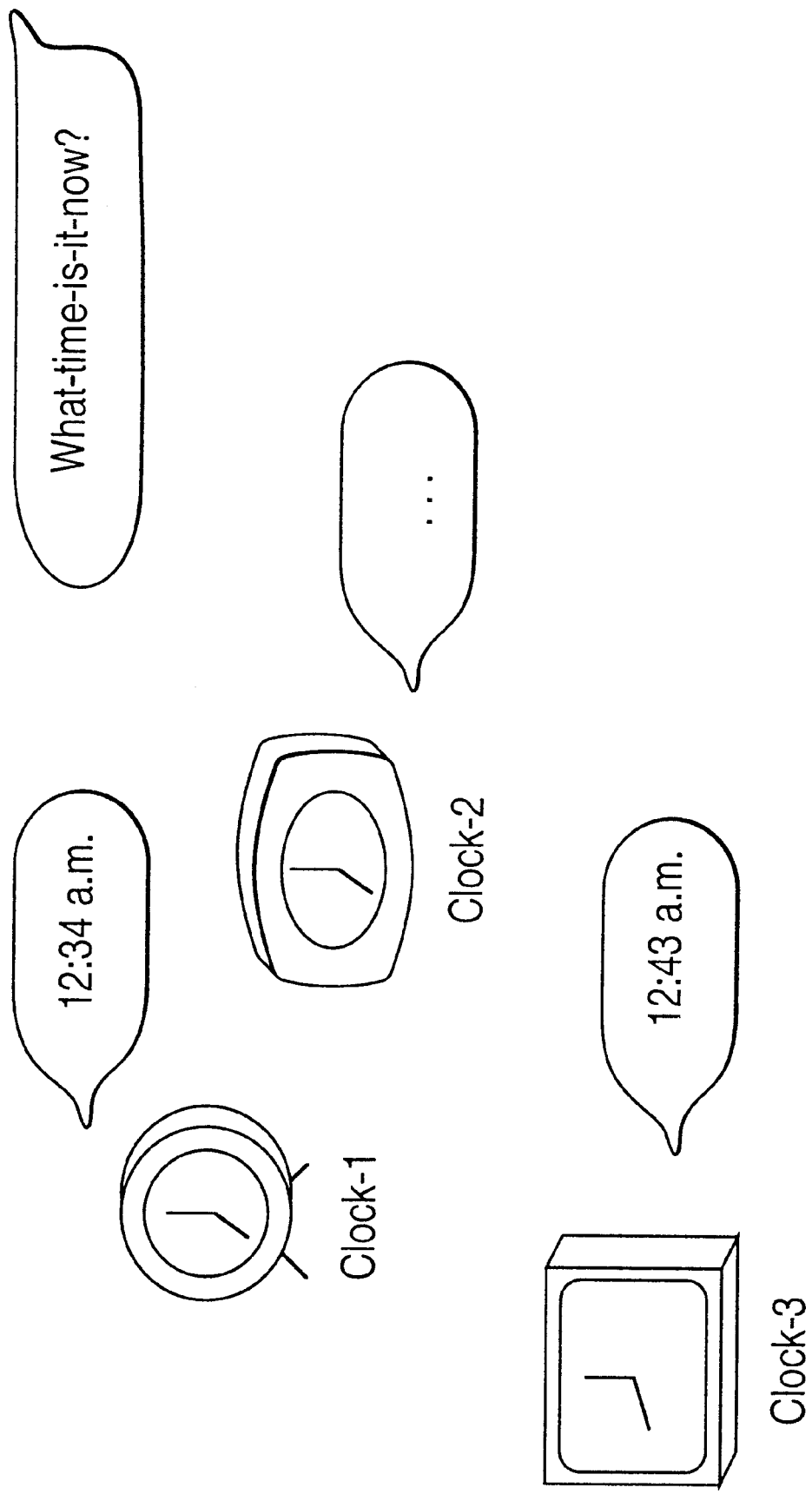
FIG. 25 shows an illustrative application of the present invention to clocks.

The disclosure considers an entrance light that, as is depicted in FIG. 23, gives answers as follows.

Entrance Light

Human: Entrance-light, turn-on!=Entrance, turn-on-light!

Human: Everyone, turn-on-light!=All lights, turn-on!

Human: Everyone, I'm home.

The dialog rules for this entrance light can be described as is shown in FIG. 24.

Specifically, it is possible to cause the entrance light to turn on in response to speech, by storing in the dialog rules database the dialog rules defining a peculiar function (innate-operation: in this case, "turn-on-light" is the function that turns on the light) with respect to the input semantic representation (in-speech) as is shown in FIG. 24.

Further, the dialog target may be either specified, as in the above illustration, or not specified (see (2-1) above).

(3-2) A Clock

The disclosure next considers a clock that, as is shown in FIG. 25, gives answers as follows.

Clock

Human: What-time-is-it-now?

Clock-1: (Sir,) 12:34 a.m.

(Clock-2): (Sir,) 12:34 a.m.)

Clock-3: (Sir,) 12:43 a.m.

Human: Clock-3, Synchronize-to Clock-1

Clock-3: Clock-1, teach-time!

Clock-1: Clock-3, Change-time-to 12:36!

Clock-3: (Sir,) thank you.

In the above conversation, a human asks a clock for the time, and Clock-1 and Clock-3 inform the human of the time by way of speech (because the response that Clock-2 would have given is the same as that given by Clock-1, Clock-2 does not produce speech). The human commands Clock-3 to adjust its time. Clock-3 asks Clock-1 for the time and coordinates its time with that of Clock-1.

The dialog rules for this clock can be described as is shown in FIG. 26.

It is possible to realize a "speech response" with respect to a question for the present time, as well as a "time inquiry" function and a "time coordination" function in response to an instruction for time coordination, by storing in the dialog rules database, as dialog rules, an output semantic representation (out-speech) with respect to an input semantic representation (in-speech), as well as an innate operation.

Figure 1:
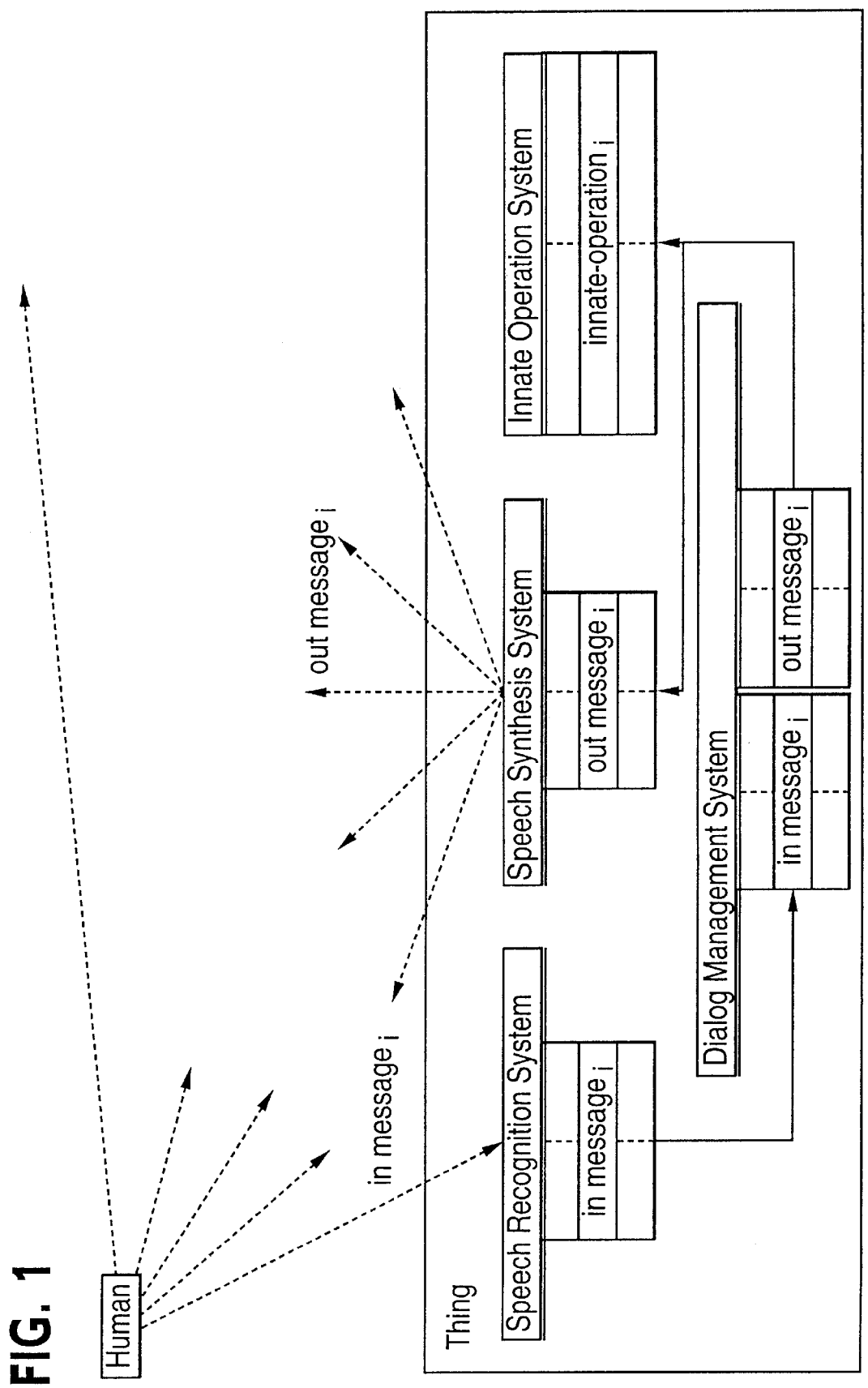
FIG. 1 discloses the operation of a conventional interface system.
Figure 2:
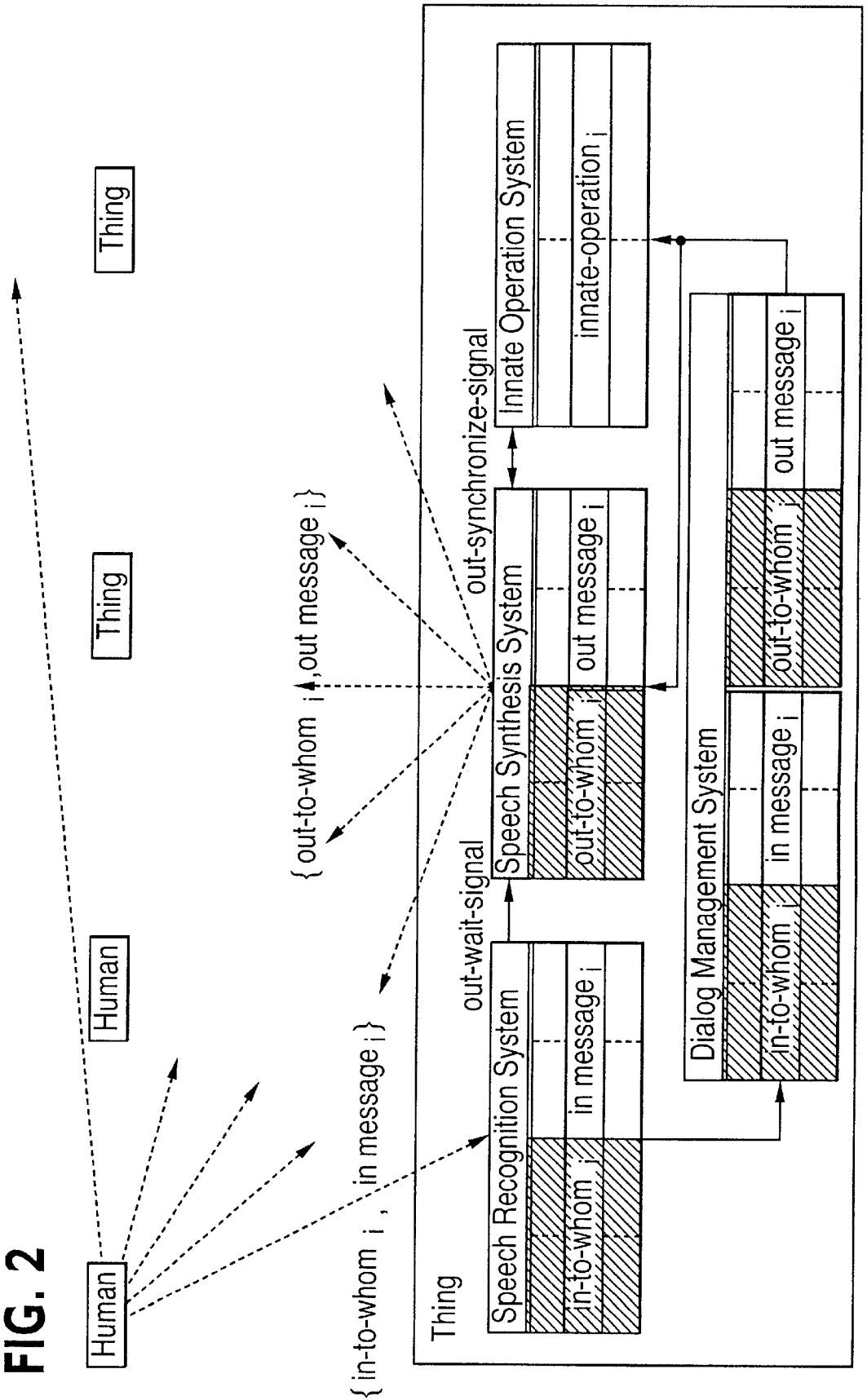
FIG. 2 discloses the operation of the TDI system.
Figure 3:
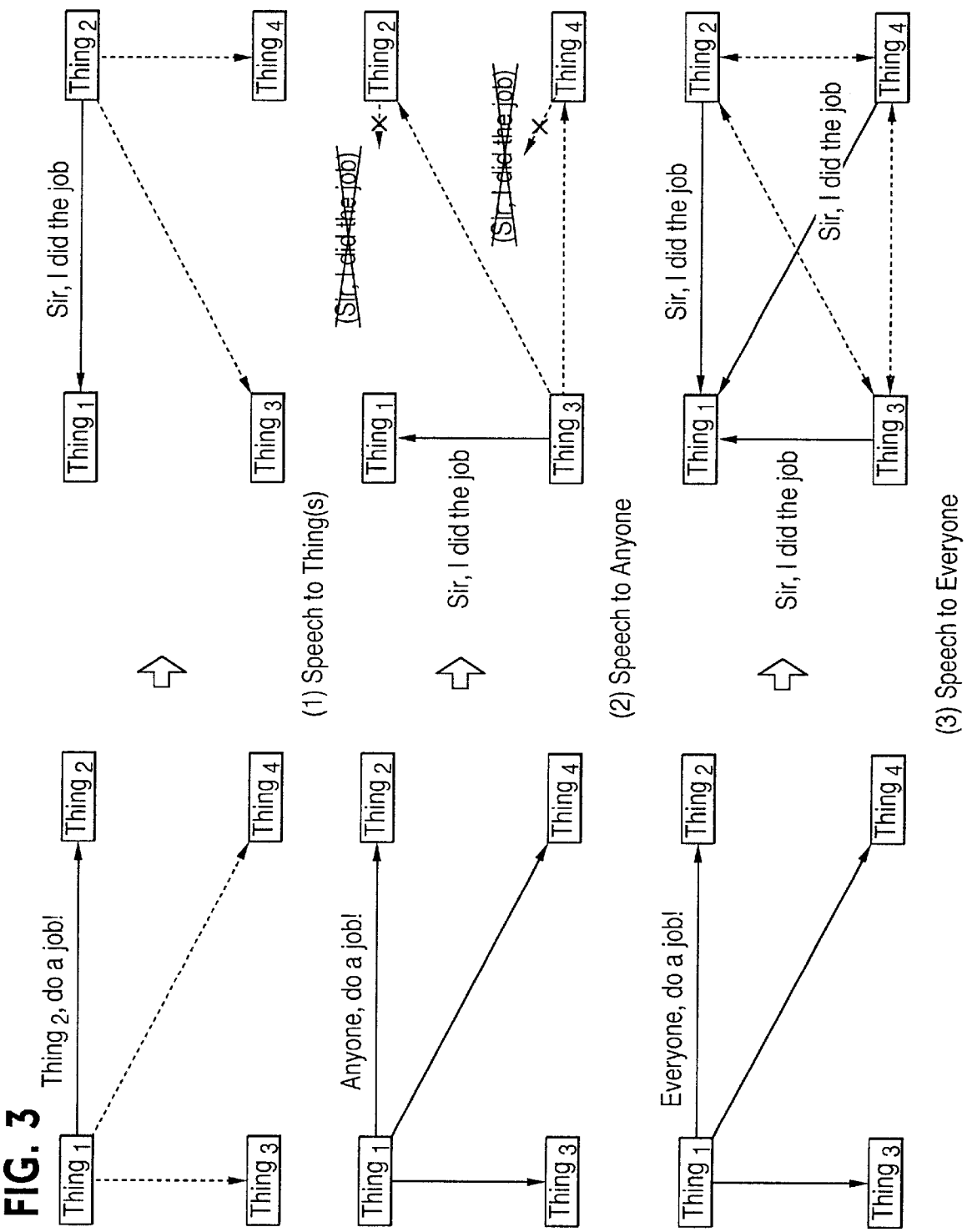
FIG. 3 discloses the operating features of the TDI system.

Here, "$Time" and "$clock", to which the dollar-sign is affixed represent variables. "$Time" is an environmental variable that represents the present time. The value of the time is updated automatically and stored as an internal information (see FIG. 2 and accompanying text, above).

Figure 27:
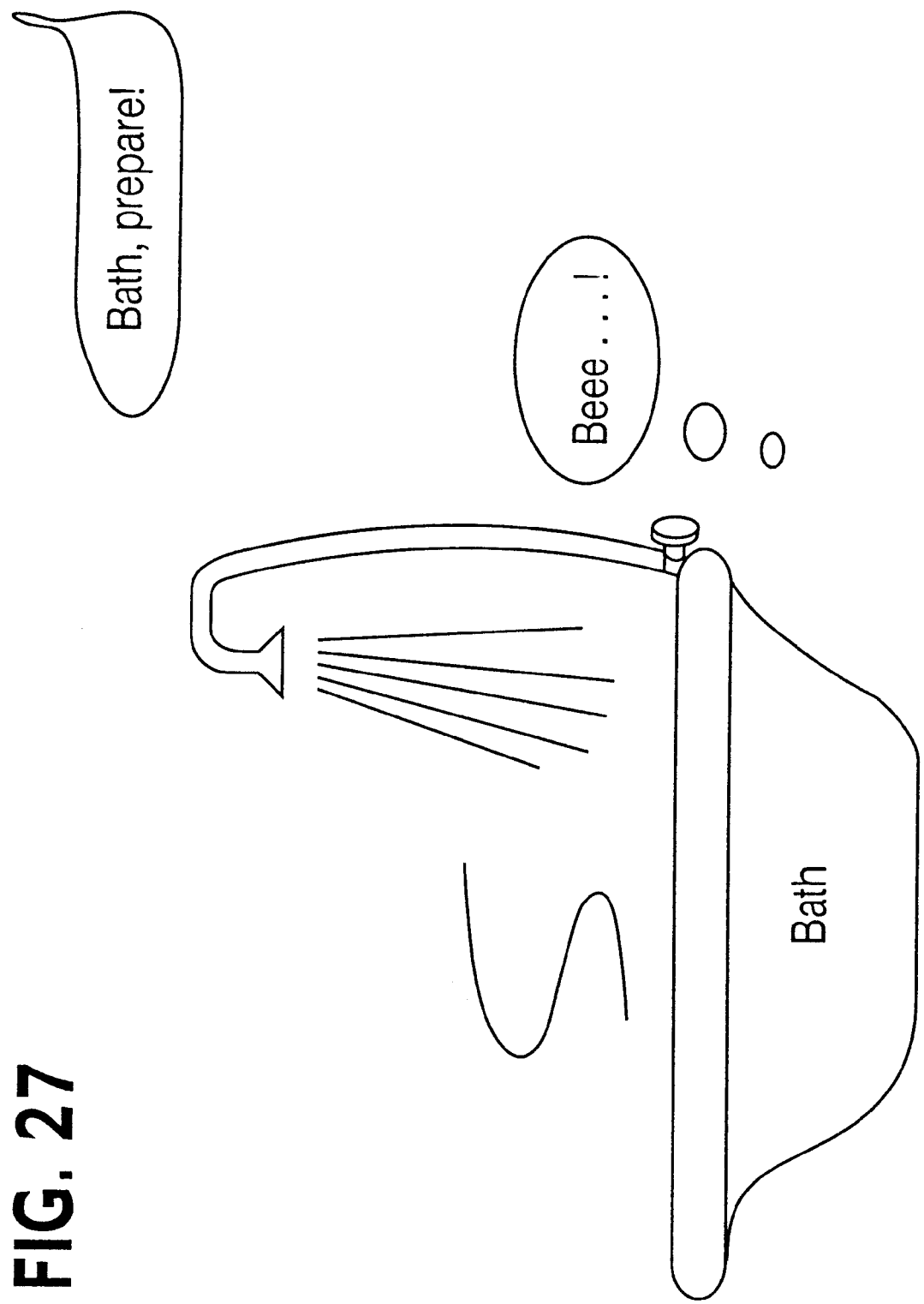
FIG. 27 shows an illustrative application of the present invention to a bath.
Figure 29:
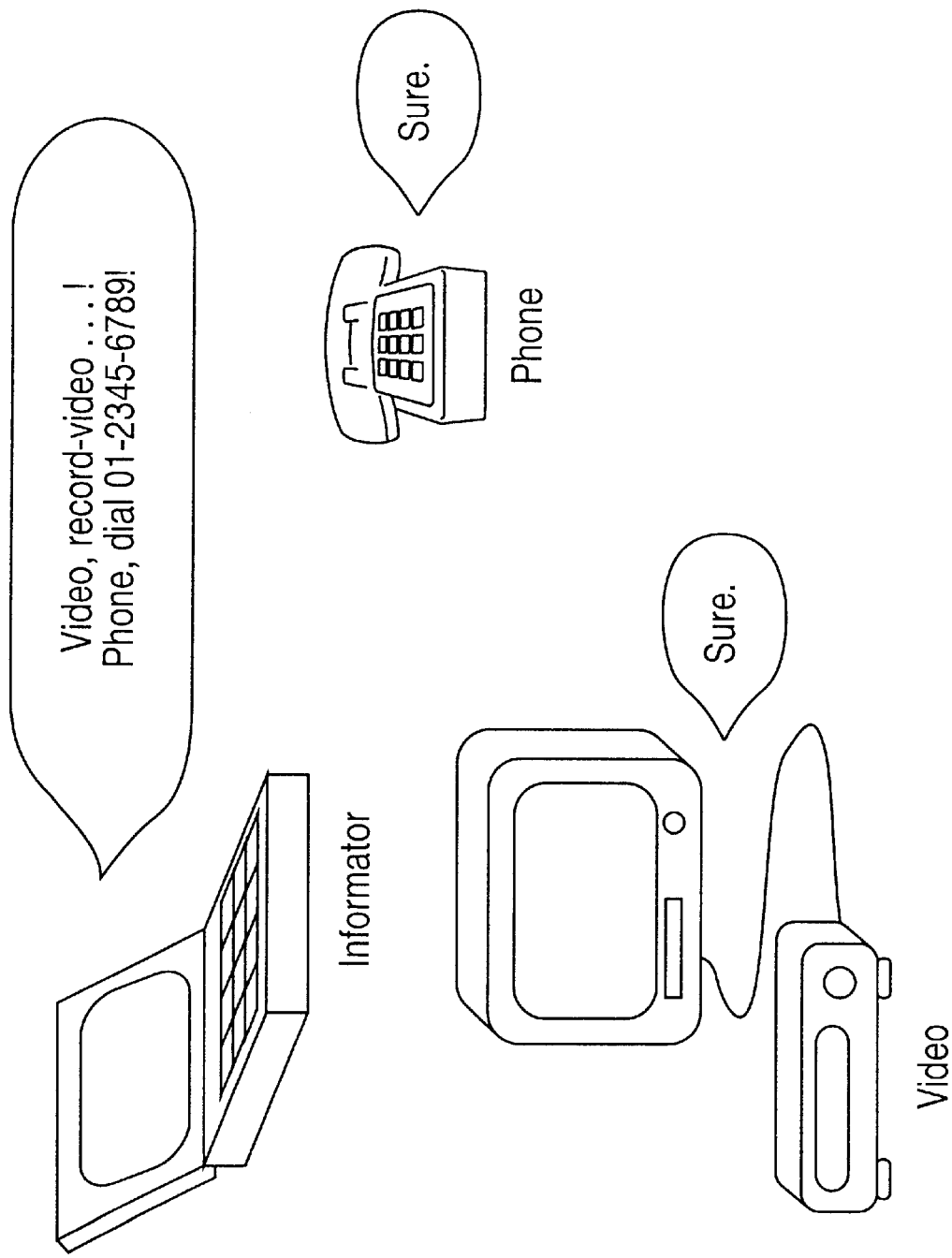
FIG. 29 shows an illustrative application of the present invention to an informator, a video recorder, and a telephone.

In this case, because the time provided by Clock-2 is the same as that provided by Clock-1, care must be taken to ensure that the speech of Clock-2 is dismissed. Thus, it is possible in the case of this clock to avoid a redundant conversation (see (2-3)). (3-3) The Filling of a Bath The disclosure now considers a bath that, as is shown in FIG. 27, gives answers as follows.

Bath

Here, items to which the dollar sign is attached as a prefix, such as "$key" and "$content", represent variables. Items enclosed in quotation marks, such as "phone-no.", represent constants.

The informator possesses initiative (see (2-5)), in the sense that it is able to command a video recorder to undertake recording.

(3-5) A Closet

Figure 32:
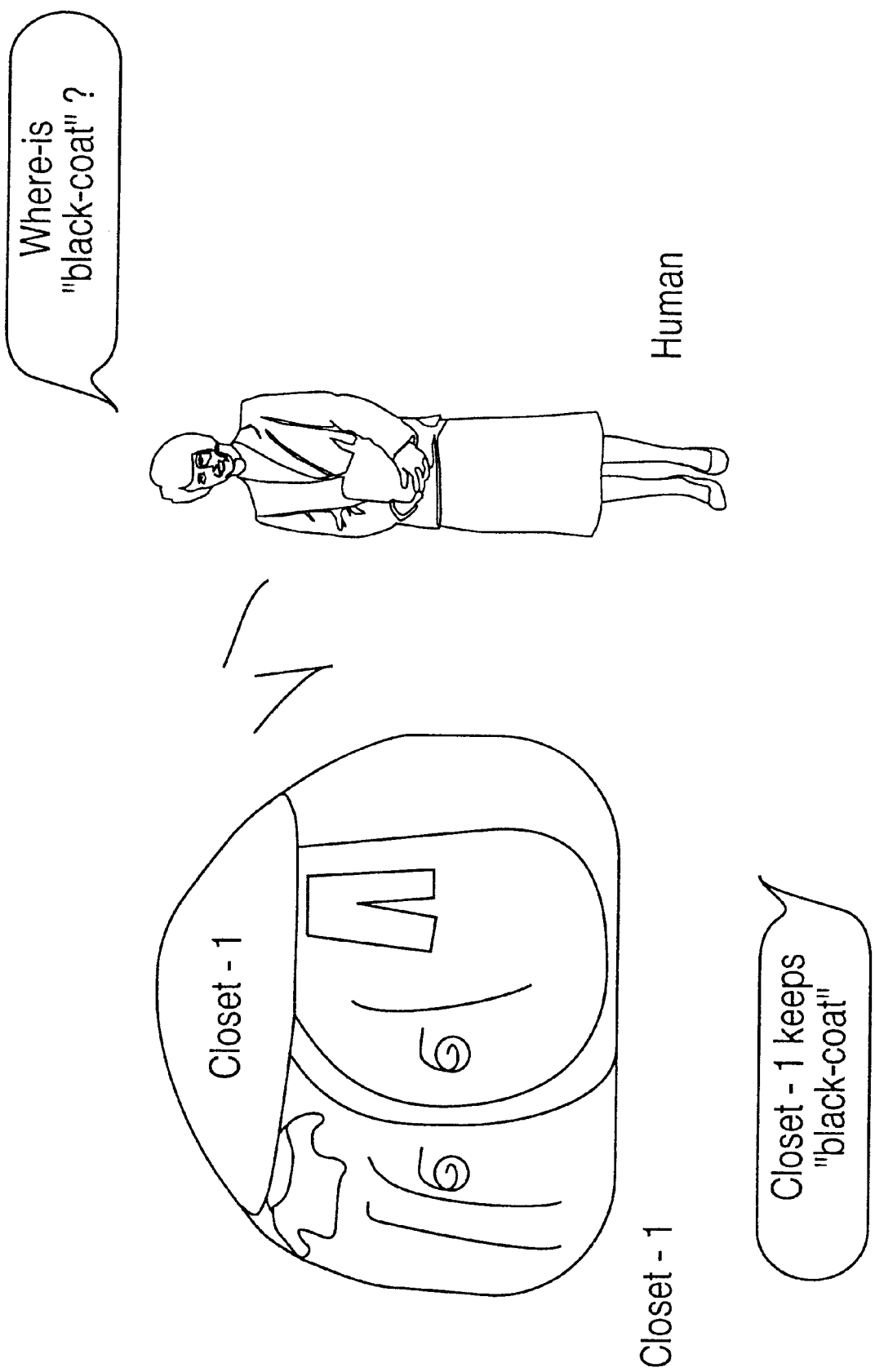
FIG. 32 shows an illustrative application of the present invention to a closet.

The disclosure next considers a closet that, as is shown in FIG. 32, gives the following answers.

Closet
Human: Closet-1, keep "black-coat"!
Closet-1: (Sir,) sure.
Human: Closet-2, keep "ski-wear"!
Closet-2: (Sir,) sure.
Human: (Anyone) where -is "black-coat"?
Closet-1: (Sir,) Closet-1 keeps "black-coat".

The dialog rules for this closet can be described as is shown in FIG. 33.

Here, the "add-dialog-rule [. . . ]" and "delete-dialog-rule [. . . ]" in the above dialog rules correspond respectively to high-level rules for adding and deleting dialog rules.

By storing in the dialog rules database, as dialog rules, an output semantic representation (out-speech) responsive to an input semantic representation (in-speech) and the high-level rules mentioned above, a dialog rule corresponding to a voiced-description, by a human, of an article of clothing put into the closet is added to the dialog rules database, and, when the human asks the closet where the article of clothing is, the closet is able to respond to the human.

Thus, in the sense that the closet is able by itself to add and to delete dialog rules, the closet possesses autonomy (see (2-6)).

(3-6) A Cleaning Robot

Figure 34:
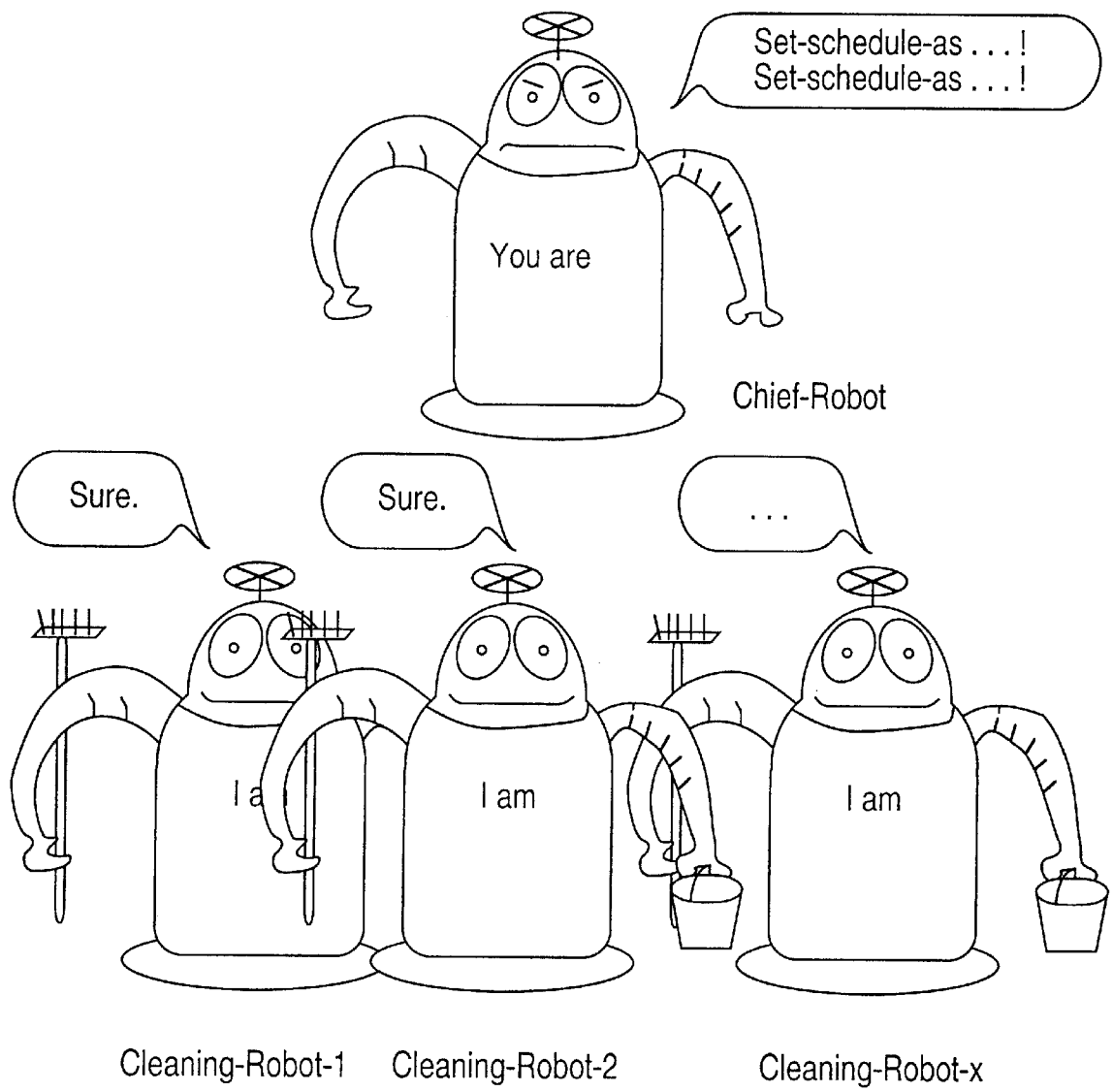
FIG. 34 shows an illustrative application of the present invention to cleaning robots.

The disclosure next considers a cleaning robot that, as is shown in FIG. 34, answers as follows. The cleaning robots depicted in FIG. 34 consist of one chief robot, which apportions the work, and any number of cleaning robots, which actually do the cleaning.

Cleaning-Robot
Human: Chief-Robot, set-schedule-as 10:00–11:00 a.m., floors 15–18!Chief-Robot, set schedule-as 11:00 a.m.–12:00 p.m., floors 1–4!
Chief-Robot: Cleaning-Robots-1&2, set-schedule-as 10:00–11:00 a.m., floors 15–16!
Cleaning-Robot-1: (sir,) sure.
Cleaning-Robot-2: (sir,) sure.
Chief-Robot: Cleaning-Robots-1&2, set-schedule-as 11:00 a.m.–12:00 p.m., floors 1–2!
Cleaning-Robot-1: (sir,) sure.
Cleaning-Robot-2: (sir,) sure.
Chief-Robot: Cleaning-Robots-3&4, set-schedule-as 10:00–11:00 a.m., floors 17–18!
Cleaning-Robot-3: (sir,) sure.
Cleaning-Robot-4: (sir,) sure.
Chief-Robot: Cleaning-Robots-3&4, set-schedule-as 11:00 a.m.–12:00 p.m., floors 3–4!
Cleaning-Robot-3: (sir,) sure.
Cleaning-Robot-4: (sir,) sure.

The preceding conversation illustrates an instance in which a human orders a chief robot to clean floors 15–18 from between 10:00 and 11:00 a.m., and floors 1–4 from between 11:00 a.m. and 12:00 p.m. Receiving these orders, the chief robot allocates the work among the cleaning robots 1–4.

The dialog rules for these cleaning robots can be described as is shown in FIG. 35.

By storing in the dialog rules database for the chief robot, as dialog rules, an output semantic representation (out-speech) responsive to an input semantic representation (in-speech) and an innate operation (innate-operation), as is shown in FIG. 35, the chief robot is able to allocate work, in response to a cleaning command issued by a human to the chief robot, and to order the cleaning robots to perform the work.

Similarly, by storing in the dialog rules database for the cleaning robots, as dialog rules, an output semantic representation (out-speech) responsive to an input semantic representation (in-speech) and an innate operation (innate-operation), as is shown in FIG. 35, it is possible to cause the cleaning robots to perform work according to a command concerning the allocation of work by the chief robot.

(3-7) A Guide-Robot and a Navigator

Figure 36:
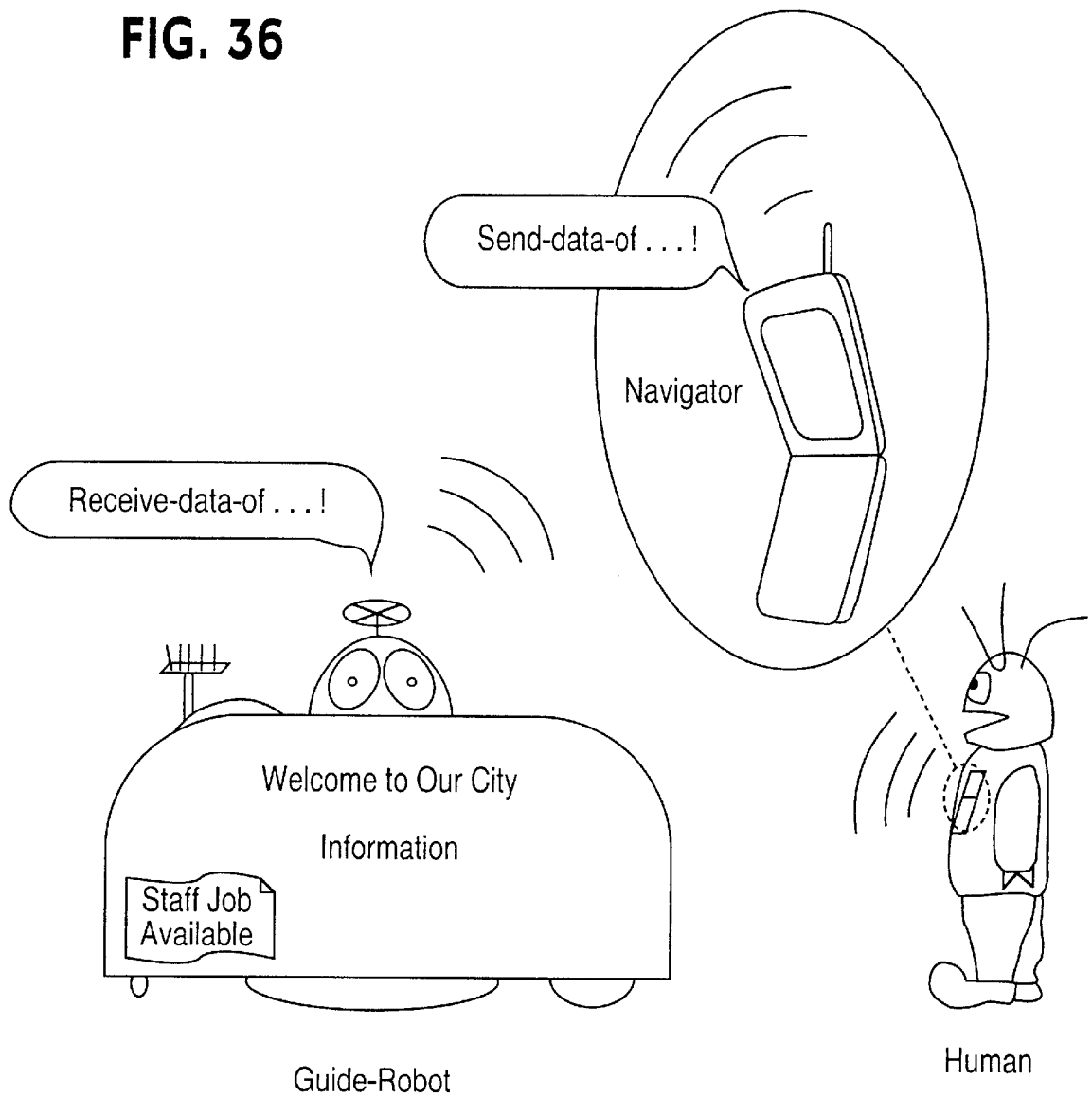
FIG. 36 shows an illustrative application of the present invention to a guide-robot and a navigator.

The disclosure next considers a guide-robot and a navigator that, as is shown in FIG. 36, give the following answers. Here, a "guide robot" refers to a robot situated in a visitors bureau, for example, that provides information concerning, illustratively, scenic spots and places of historical interest. The term "navigator", as herein used, is a type of small informator furnished with a GPS (global positioning system), or like system, and, in particular, has functions for providing information concerning routes and specific locations. In this case, the navigator is in the possession of a human, as is shown in FIG. 36.

Guide-Robot
Navigator
Human: Guide-Robot, teach "silent-temple"!
Guide-Robot: (Sir,) how-about "Ginkakuji-Temple"?
Human: Navigator, get-data-for "Ginkakuji-Temple"!
Navigator: (Sir,) sure. (Anyone,) set-address-to 111.222.333.444! (Sir,) sure. (Anyone,) send-data-for "Ginkakuji-Temple"!
Guide-Robot: (Sir,) receive-data-for "Ginkakuji-Temple"!
Navigator: Thank you.
Guide-Robot: (Sir,) you are welcome.
Human: Thank you.
Guide-Robot: (Sir,) you are welcome.

The preceding conversation illustrates an instance in which: a human addresses to a guide-robot an inquiry concerning "silent-temple"; "Ginkakuji-Temple" is recommended by the guide-robot; the human requests a navigator to collect data on the "Ginkakuji-Temple"; and the navigator relays its own address (111. 222. 333. 444) to and receives the data for the "Ginkakuji-Temple" from the guide-robot.

The dialog rules for the guide-robot can be described as is shown in FIGS. 37 and 38.

By storing in the dialog rules database for the guide-robot, as dialog rules, an output semantic representation (out-speech) with respect to an input semantic representation (in-speech) and an innate operation (innate-operation), as is shown in FIG. 37, it is possible to search for a site responsive to a question concerning a tourist site and to answer that question. It is further possible to store the address of, illustratively, the navigator, and to transmit the data for the tourist site relative to that address.

Similarly, by storing in the dialog rules database for the navigator, as dialog rules, an output semantic representation (out-speech) responsive to an input semantic representation (in-speech) and an innate operation (innate-operation) it is possible to relay one's address and forward data in response to an instruction for data collection and to cause the navigator to receive that data, as is shown in FIG. 38.

As explained above, it is possible to obtain the following results in the present invention.

(1) The TDI provides a practical interface that is amenable to humans. More specifically, humans and things, as well as fellow things, can interact by way of natural speech. Several advantages to the use of speech in interfaces have been identified over the conventional interface.

First, speech is natural to humans. That a display is not required, moreover, is also a significant advantage.

This fact is also well-suited to the compactness of the system. Further, because the system requires no manual inputs, the system is convenient for people who use the system while working or for those who are physically infirm. By using existing telephone networks, moreover, it is possible also to interact remotely.

The second advantage of speech, as described above, is that, because speech has long been used by humans as a means of communication, standardization issues are, ultimately, of no consequence.

The third advantage of speech relates to the issue of networking. Because speech is wireless and can be broadcast very simply, they are effective in interface networking within a home, for example.

(2) In addition to the advantages relating to speech, the TDI system has the following advantages. First, a human can simultaneously understand the interaction between things and, as required, make amendments or changes. Further, that things can be endowed with initiative and autonomy, and that things can be made intelligent, are additional advantages. Ultimately, these advantages contribute to the TDI system's providing an interface that is amenable to humans.

What is claimed is:

1. A dialog interface system facilitating communication between humans and inanimate objects, among humans, and among inanimate objects, comprising:

a speech recognition unit converting input speech, identifying a party from among the humans and the inanimate objects initiating the input speech, to an input semantic representation;

a dialog management unit outputting an output semantic representation corresponding to said input semantic representation, based on the input semantic representation obtained by the speech recognition system, and identifying a specific dialog target from among the humans and inanimate objects to which the input speech is directed; and a speech synthesis unit receiving the output semantic representation from the dialog management unit, converting said output semantic representation to output speech, for which the specific dialog target is designated, and outputting the output speech.

2. The dialog interface system according to claim 1, wherein the dialog management unit identifies an origin of the input speech, based on the input semantic representation received from the speech recognition unit, and outputs the output semantic representation after consideration of the identified origin.

3. The dialog interface system according to claim 1, wherein the speech recognition unit outputs a delay command that delays the output of output speech, to the speech synthesis unit, during the time that input speech is being inputted.

4. The dialog interface system according to claim 1, further comprising:

an innate operation execution unit receiving an innate operation command from the dialog management unit and executing a function corresponding to said innate operation command, and wherein said dialog management unit outputs the innate operation command that corresponds to the input semantic representation to the innate operation execution unit, based on said input semantic representation obtained by the speech recognition unit.

5. The dialog interface system according to claim 4, wherein the dialog management unit identifies an origin of the input speech, based on the input semantic representation received from the speech recognition unit, and outputs the innate operation command after consideration of the identified origin.

6. The dialog interface system according to claim 4, wherein the speech synthesis unit and the innate operation execution unit synchronize, by way of a synchronization notification signal, the output of the output speech and the innate operation.

7. The dialog interface system according to claim 4, wherein the dialog management unit comprises a dialog rules storage unit storing an aggregate of dialog rules for the input semantic representation and the output semantic representation, and outputs at least one of the output semantic representation and innate operation command that correspond to the input semantic representation inputted from the speech recognition unit, based on the dialog rules stored in said dialog rules storage unit.

8. The dialog interface system according to claim 7, wherein the dialog management unit comprises, with respect to the dialog rules that are stored in the dialog rules storage unit, an add function, a modify function, and a delete function.

9. A dialog interface apparatus facilitating communication between humans and inanimate objects, among humans, and among inanimate objects, comprising:

a speech recognition unit converting input speech, identifying a party from among the humans and the inanimate objects initiating the input speech, to an input semantic representation;

a dialog management unit identifying an origin of said input speech, based on said input semantic representation obtained by said speech recognition unit, identifying a target of output speech from among the humans and inanimate objects, and outputting a corresponding innate operation command based on the identified origin and said input semantic representation; and an innate operation execution unit executing an operation corresponding to the innate operation command.

10. A dialog interface apparatus facilitating communication between humans and inanimate objects, among humans, and among inanimate objects, comprising:

a dialog management unit system identifying by whom from among the humans and the inanimate objects input speech is initiated and a dialog target from among the humans and inanimate objects to which the input speech is directed, and outputting an output semantic representation and data specifying the dialog target that is to recognize said output semantic representation; and a speech synthesis unit converting the output semantic representation and said data to output speech that represents said output semantic representation and said dialog target, based on the data received from the dialog management unit, and outputting said output speech.

11. A method, utilizing a dialog management apparatus, that executes processes based on a dialog and facilitates communication between humans and inanimate objects, among humans, and among inanimate objects, comprising:

converting input speech, identifying a party from among the humans and the inanimate objects initiating the input speech, to an input semantic representation;

generating an output semantic representation that corresponds to the input semantic representation, based on said input semantic representation;

identifying a specific dialog target from among the humans and inanimate objects to which the input speech is directed; and converting said output semantic representation to output speech, for which the specific dialog target is designated, and outputting said output speech.

12. The method according to claim 11, further comprising:

identifying an origin of the input speech, based on the input semantic representation; and outputting the output semantic representation upon consideration of said identified origin.

13. The method according to claim 11, further comprising:

outputting a delay command that delays the output of the output speech, during the time that input speech is being inputted.

14. The method according to claim 11, further comprising:

dismissing one of the input semantic representations, when one of the successive input semantic representations and the output semantic representations corresponding to the other input semantic representations are identical.

15. The method according to claim 11, further comprising:

generating an innate operation command that corresponds to the input semantic representation, based on said input semantic representation; and receiving said innate operation command and executing an operation corresponding to said innate operation command.

16. The method according to claim 15, further comprising:

identifying an origin of the input speech, based on the input semantic representation; and outputting the innate operation command upon consideration of said identified origin.

17. The method according to claim 15, further comprising:

outputting at least one of the output semantic representation that corresponds to the input semantic representation and the innate operation command.

18. The method according to claim 15, further comprising:

synchronizing, by way of a synchronization notification signal, an output of the output speech and an execution of the innate operation.

19. A method, utilizing a dialog management apparatus, that executes processes based on a dialog and facilitates communication between humans and inanimate objects, among humans, and among inanimate objects, comprising:

converting input speech, identifying a party from among the humans and the inanimate objects initiating the input speech, to an input semantic representation;

identifying an origin of said input speech, based on said input semantic representation, identifying a target from among the humans and inanimate objects to which the input speech is directed, and outputting a corresponding innate operation command based on the identified origin and said input semantic representation; and executing a function corresponding to the innate operation command.

20. A method, utilizing a dialog management apparatus, that executes processes based on a dialog and facilitates communication between humans and inanimate objects, among humans, and among inanimate objects, comprising:

identifying by whom from among the humans and the inanimate objects input speech is initiated and a dialog target from among the humans and inanimate objects to which the input speech is directed;

outputting an output semantic representation and data identifying the dialog target that is to recognize said output semantic representation; and converting the output semantic representation and said data to output speech that represents said output semantic representation and said dialog target.

21. A computer-readable medium including a program for causing a computer to execute a processing method based on a dialog, said processing method facilitating communication between humans and inanimate objects, among humans, and among inanimate objects and comprising:

converting input speech, identifying a party from among the humans and the inanimate objects initiating the input speech, to an input semantic representation;

generating an output semantic representation that corresponds to said input semantic representation, based on said input semantic representation;

identifying a specific dialog target from among the humans and inanimate objects to which the input speech is directed; and converting said input semantic representation to output speech, for which the specific dialog target is designated, and outputting the output speech.

22. The computer-readable medium according to claim 21, the processing method further comprising:

identifying an origin of the input speech, based on the input semantic representation; and outputting the output semantic representation upon consideration of said identified origin.

23. The computer-readable medium according to claim 21, the processing method further comprising:

outputting a delay command that delays the output of the output speech, during the time that input speech is being inputted.

24. The computer-readable medium according to claim 21, the processing method further comprising:

dismissing one of the input semantic representations, when one of the successive input semantic representations and the output semantic representations corresponding to the other input semantic representations are identical.

25. The computer-readable medium according to claim 21, the processing method further comprising:

generating an innate operation command that corresponds to the input semantic representation, based on said input semantic representation; and receiving said innate operation command and executing an operation corresponding to said innate operation command.

26. The computer-readable medium according to claim 25, the processing method further comprising:

identifying an origin of the input speech, based on the input semantic representation; and outputting the innate operation command upon consideration of the identified origin.

27. The computer-readable medium according to claim 25, the processing method further comprising:

outputting at least one of the output semantic representation that corresponds to the input semantic representation and the innate operation command.

28. The computer-readable medium according to claim 25, the processing method further comprising:

synchronizing, by way of a synchronization notification signal, an output of the output speech and an execution of the innate operation.

29. A computer-readable medium including a program for causing a computer to execute a processing method based on a dialog, said processing method facilitating communication between humans and inanimate objects, among humans, and among inanimate objects and comprising:

converting input speech, identifying a party from among the humans and inanimate objects initiating the input speech, to an input semantic representation;

identifying an origin of said input speech, based on said input semantic representation, and outputting a corresponding innate operation command based on the identified origin and said input semantic representation;

identifying a target from among the humans and inanimate objects to which the input speech is directed; and executing an operation corresponding to said innate operation command.

30. A computer-readable medium including a program for causing a computer to execute a processing method based on a dialog, said processing method facilitating communication between humans and inanimate objects, among humans, and among inanimate objects and comprising:

identifying by whom from among the humans and inanimate objects the input speech is initiated and a dialog target from among the humans and inanimate objects to which the input speech is directed;

outputting an output semantic representation and data identifying the dialog target that is to recognize said output semantic representation; and converting said output semantic representation and said data to output speech that represents said output semantic representation and said dialog target, based on said data, and outputting the output speech.

* * * * *